United States Patent
Montag et al.

(10) Patent No.: US 10,816,382 B2
(45) Date of Patent: *Oct. 27, 2020

(54) METERING SYSTEM FOR SOLID PARTICULATE

(71) Applicant: Montag Investments, LLC, Emmetsburg, IA (US)

(72) Inventors: Roger A. Montag, Malcolm, NE (US); Isaac Mogler, West Bend, IA (US); Jason Fehr, Ottosen, IA (US)

(73) Assignee: MONTAG INVESTMENTS, LLC, Emmetsburg, IA (US)

( * ) Notice: Subject to any disclaimer, the term of this patent is extended or adjusted under 35 U.S.C. 154(b) by 187 days.

This patent is subject to a terminal disclaimer.

(21) Appl. No.: 16/108,461

(22) Filed: Aug. 22, 2018

(65) Prior Publication Data
US 2018/0356269 A1     Dec. 13, 2018

Related U.S. Application Data

(63) Continuation of application No. 14/600,621, filed on Jan. 20, 2015, now Pat. No. 10,060,780.

(51) Int. Cl.
  *G01F 11/00*     (2006.01)
  *B65G 53/16*    (2006.01)
  (Continued)

(52) U.S. Cl.
  CPC ............ *G01F 11/003* (2013.01); *A01C 15/04* (2013.01); *B01F 3/06* (2013.01); *B65G 53/16* (2013.01);
  (Continued)

(58) Field of Classification Search
  CPC ...... A01C 15/04; B01F 2003/063; B01F 3/06; B65G 53/16; B65G 53/528; G01F 11/003
  See application file for complete search history.

(56) References Cited

U.S. PATENT DOCUMENTS

318,377 A    5/1885 Latcha
557,058 A    3/1896 Dodge
(Continued)

FOREIGN PATENT DOCUMENTS

CN    101828099 A    9/2010
CN    202497837 U    10/2012
(Continued)

OTHER PUBLICATIONS

"International Application No. PCT/US2015/012021 International Search Report and Written Opinion", dated May 5, 2015, 18 pages.
(Continued)

*Primary Examiner* — Tony G Soohoo
(74) *Attorney, Agent, or Firm* — Goodhue, Coleman & Owens, P.C.

(57) ABSTRACT

An improved particulate metering system is provided. The system includes a flow path having an inlet in communication with an intake and an outlet in communication with a discharge. The flow path receives a first input and a plurality of inputs, each of the plurality of inputs having a separate origin. A mixing area within the flow path comprises a confluence of the first input and one or more of the plurality of inputs. One or more metering controls are in operable communication with the first input and the plurality of inputs for controlling a blend of the plurality of inputs at the confluence.

20 Claims, 34 Drawing Sheets

(51) Int. Cl.
*B65G 53/52* (2006.01)
*B01F 3/06* (2006.01)
*A01C 15/04* (2006.01)

(52) U.S. Cl.
CPC ...... *B65G 53/528* (2013.01); *B01F 2003/063* (2013.01)

(56) References Cited

U.S. PATENT DOCUMENTS

| | | |
|---|---|---|
| 771,118 A | 9/1904 | Bechtel et al. |
| 1,630,317 A | 5/1927 | Skonier |
| 1,786,969 A | 12/1930 | Van Der Heuel |
| 1,805,940 A | 5/1931 | Dolan |
| 1,992,090 A | 2/1935 | Paolo |
| 2,395,973 A | 3/1946 | Mcintosh |
| 2,452,898 A | 11/1948 | Bourdette |
| 2,793,914 A | 5/1957 | Gardeniers et al. |
| 2,865,260 A | 12/1958 | Lee |
| 2,959,869 A | 11/1960 | Ackerman |
| 3,314,734 A | 4/1967 | Lewis |
| 3,373,973 A | 3/1968 | Holthausen |
| 3,386,773 A | 6/1968 | Ballard, Jr. |
| 3,568,937 A | 3/1971 | Grataloup |
| 3,596,805 A | 8/1971 | Farmery |
| 3,606,097 A | 9/1971 | Wall |
| 3,625,431 A | 12/1971 | Andersson |
| 3,708,208 A | 1/1973 | Fuss |
| 3,710,983 A | 1/1973 | Ricciardi |
| 3,893,515 A | 7/1975 | Sadler |
| 3,894,721 A | 7/1975 | Boenisch |
| 3,926,377 A | 12/1975 | Johnson |
| 4,008,855 A | 2/1977 | van der Lely |
| 4,020,991 A | 5/1977 | Dreyer |
| 4,087,079 A | 5/1978 | Kramer |
| 4,142,685 A | 3/1979 | Dreyer et al. |
| 4,296,695 A | 10/1981 | Quanbeck |
| 4,402,635 A | 9/1983 | Maruo |
| 4,413,934 A | 11/1983 | Kern |
| 4,422,810 A | 12/1983 | Boring |
| 4,432,675 A | 2/1984 | Machnee |
| 4,473,016 A | 9/1984 | Gust |
| 4,479,743 A | 10/1984 | Stahl |
| 4,495,968 A | 1/1985 | Kist |
| 4,529,104 A | 7/1985 | Tyler |
| 4,561,781 A | 12/1985 | Seymour |
| 4,562,968 A | 1/1986 | Widmer et al. |
| 4,569,486 A | 2/1986 | Balmer |
| 4,583,883 A | 4/1986 | Johanning |
| 4,793,744 A | 12/1988 | Montag |
| 4,801,210 A | 1/1989 | Gian |
| 4,834,004 A | 5/1989 | Butuk et al. |
| 4,900,157 A | 2/1990 | Stegemoeller et al. |
| 5,018,869 A | 5/1991 | Paul |
| 5,104,229 A | 4/1992 | Paul |
| 5,299,888 A | 4/1994 | Wysong et al. |
| 5,592,889 A | 1/1997 | Bourgault |
| 5,775,585 A | 7/1998 | Duello |
| 5,913,602 A | 6/1999 | Steele |
| 5,934,205 A | 8/1999 | Gordon |
| 6,142,714 A | 11/2000 | Montag |
| 6,305,835 B1 | 10/2001 | Farrar et al. |
| 7,344,298 B2 | 3/2008 | Wilmer et al. |
| 7,854,066 B2 | 12/2010 | Wendte |
| 8,336,469 B2 | 12/2012 | Preheim et al. |
| 8,616,761 B2 | 12/2013 | McLaughlin et al. |
| 9,681,602 B2 | 6/2017 | Montag et al. |
| 9,781,878 B2 | 10/2017 | Montag |
| 2003/0161694 A1 | 8/2003 | Bauver et al. |
| 2005/0024988 A1 | 2/2005 | Hoff et al. |
| 2012/0186501 A1 | 7/2012 | Zarnescu et al. |
| 2012/0211508 A1 | 8/2012 | Barsi et al. |
| 2012/0230778 A1 | 9/2012 | Petit et al. |
| 2014/0261116 A1 | 9/2014 | Redman et al. |
| 2016/0207015 A1 | 7/2016 | Montag et al. |
| 2016/0207016 A1 | 7/2016 | Montag et al. |
| 2016/0207016 A1 | 7/2016 | Montag et al. |
| 2016/0207018 A1 | 7/2016 | Montag et al. |
| 2016/0207718 A1 | 7/2016 | Montag et al. |

FOREIGN PATENT DOCUMENTS

| | | |
|---|---|---|
| CN | 103349930 A | 10/2013 |
| CN | 104923097 A | 9/2015 |

OTHER PUBLICATIONS

European Patent Office, "Supplementary European Search Report and the European search opinion", Application No. 15879147.5-1001/3247190, 16 pages, dated Jan. 11, 2019.

"International Application No. PCT/US2015/012050 International Search Report and Written Opinion", dated May 5, 2015, 17 pages.

Mogler, Indian Examination Report, Application No. 201727029297, dated Jun. 23, 2020, 6 Page, No New Reference.

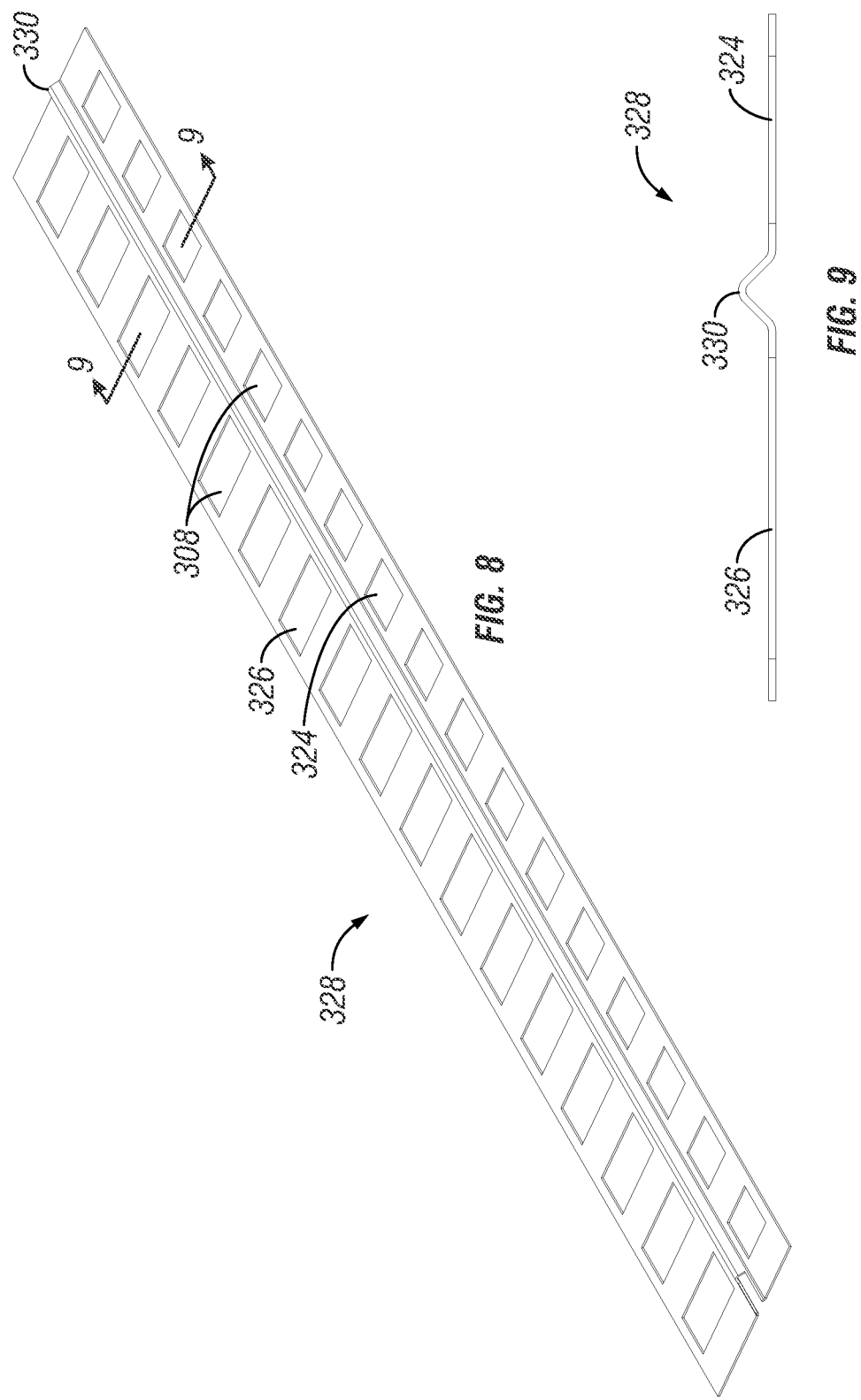

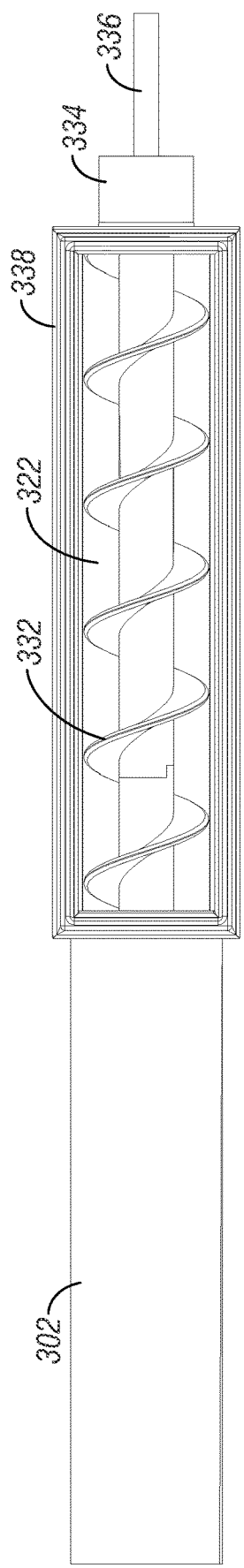
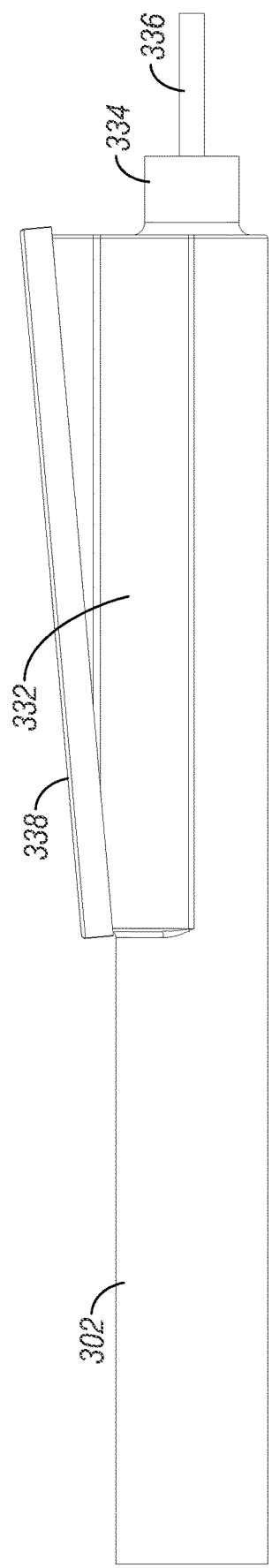
FIG. 11B
FIG. 11C

METERING SYSTEM FOR SOLID PARTICULATE

PRIORITY STATEMENT

This application is a continuation of U.S. patent application Ser. No. 14/600,621, filed Jan. 20, 2015, which is also entitled "Metering System for Solid Particulate," all of which is hereby incorporated by reference in its entirety.

BACKGROUND

I. Field of the Disclosure

A metering system for solid particulate is disclosed. More specifically, but not exclusively, a metering system with variable blend and variable application rate controls for particulate matter, such as dry fertilizers, is disclosed.

II. Description of the Prior Art

Particulate metering systems use varied approaches to control the rate at which particulate is metered and/or blended with other particulate types. Particulate metering is complicated by the desire to simultaneously meter at separate discharge points varying rates and blends of different particulate. In such instances where the particulate is fertilizer, there's a significant interest in controlling the blend and application rate of two or more fertilizers, and specifically controlling a variation in the blend and application rate of two or more fertilizers at separate discharge points, such as at separate rows in a field. Further complications surround the growing desire to independently control variations in both the blend and application rate of particulate for each separate discharge point or a set of discharge points. Many desire to control the blend and application rate of two or more fertilizers independently at each row unit. In other words, what is desired in at least one application is a dry fertilizer metering system that can make adjustments to both the application rate and blend of two or more fertilizers on a row-by-row basis-one row receiving a blend of fertilizers at a desired rate while another row simultaneously receives the same or a separate blend of fertilizers at the same or another desired rate.

SUMMARY

The present disclosure provides a particulate metering system with variable blend and variable application rate controls for separate discharges or a group of discharges.

A particulate metering system includes a flow path having an inlet in communication with an intake and an outlet in communication with a discharge. A first input into the flow path is provided. A plurality of inputs is in communication with the flow path—each of the plurality of inputs has a separate origin. A mixing area within the flow path is a confluence of the first input and one or more of the plurality of inputs. One or more metering controls are in operable communication with the first input and the plurality of inputs for controlling a ratio of the plurality of inputs at the confluence.

The particulate metering system can include a plurality of outputs at the discharge. The outputs are in communication with the first input by the flow path. The first input has a metered proportion across the outputs.

The particulate metering system can include a rate controller. The rate controller is in operable control of the one or more metering controls and controls the introduction rate of the plurality of inputs into the confluence.

According to another aspect of the disclosure, the particulate metering system includes a flow path having an inlet with an intake, an outlet with a plurality of discharges, a plurality of air inputs fluidly connected to the plurality of discharges, and an air-particulate output. Two or more particulate sources are provided. The particulate metering system includes a plurality of particulate inputs in communication with the flow path.

Each of the particulate inputs has a separate origin. A particulate-air mixing area is within the flow path and comprises a confluence of one of the air inputs and one or more of the particulate inputs. Operated conveyances can be in communication with the two or more particulate sources and the particulate-air confluence, each operated conveyance having separate discharges.

One or more metering controls can be in operable communication with the air input and the particulate inputs for controlling a blend of the plurality of inputs at the confluence. A plurality of conveyance speeds can be associated with the operated conveyances. The two or more particulate sources are operatively connected to the plurality of particulate inputs and the one or more metering controls.

According to yet another aspect of the disclosure, an air flow origin is provided. The particulate metering system includes a plurality of particulate accelerators, a plurality of air-particulate interfaces, a mixing area, and an air-particulate output. Each of the particulate accelerators has an air input. The system includes a plurality of particulate sources associated with each of the particulate accelerators. Each of the particulate sources has a terminal discharge end at each of the air-particulate interfaces. The air input of each of the particulate accelerators receives an air flow from the air flow origin. Each of the particulate accelerators receives particulate from the particulate sources across the air-particulate interfaces. A confluence of the air flow and the particulate occurs in the mixing area of each of the particulate accelerators. A plurality of discharges is provided. Each of the discharges is associated with the air-particulate output of each of the plurality of particulate accelerators.

The metering system can include a plurality of operated conveyances in communication with each of the plurality of particulate accelerators. Each of the operated conveyances can be associated with one of the air-particulate interfaces. A plurality of metering controls can be provided. The metering controls can be in operative communication with the particulate sources and the operative conveyances. The plurality of metering controls can control the amount of one or more types of particulate metered across the air-particulate interfaces.

The metering system can include a first subset of the plurality of particulate accelerators and a first subset of the plurality of discharges in fluid connection with the first subset of the plurality of particulate accelerators. A first mass flow rate can correspond generally with the particulate-air confluence at the first subset of the plurality of discharges. The system can include a second subset of the plurality of particulate accelerators and a second subset of the plurality of discharges in fluid connection with the second subset of the plurality of particulate accelerators. A second mass flow rate can correspond generally with the particulate-air confluence at the second subset of the plurality of discharges. The first mass flow rate and the second mass flow rate can be unequal.

BRIEF DESCRIPTION OF THE DRAWINGS

Illustrated embodiments of the disclosure are described in detail below with reference to the attached drawing figures, which are incorporated by reference herein, and where:

FIG. 8 is an isometric view of a bottom tray of a particulate container in accordance with an illustrative embodiment;

FIG. 9 is a cross-section view of the bottom tray of FIG. 8 taken along section line 9-9;

FIG. 11B is a top plan view of a long auger tube in accordance with an illustrative embodiment;

FIG. 11C is a side elevation view of a long auger tube in accordance with an illustrative embodiment;

DETAILED DESCRIPTION

Figure 1A:
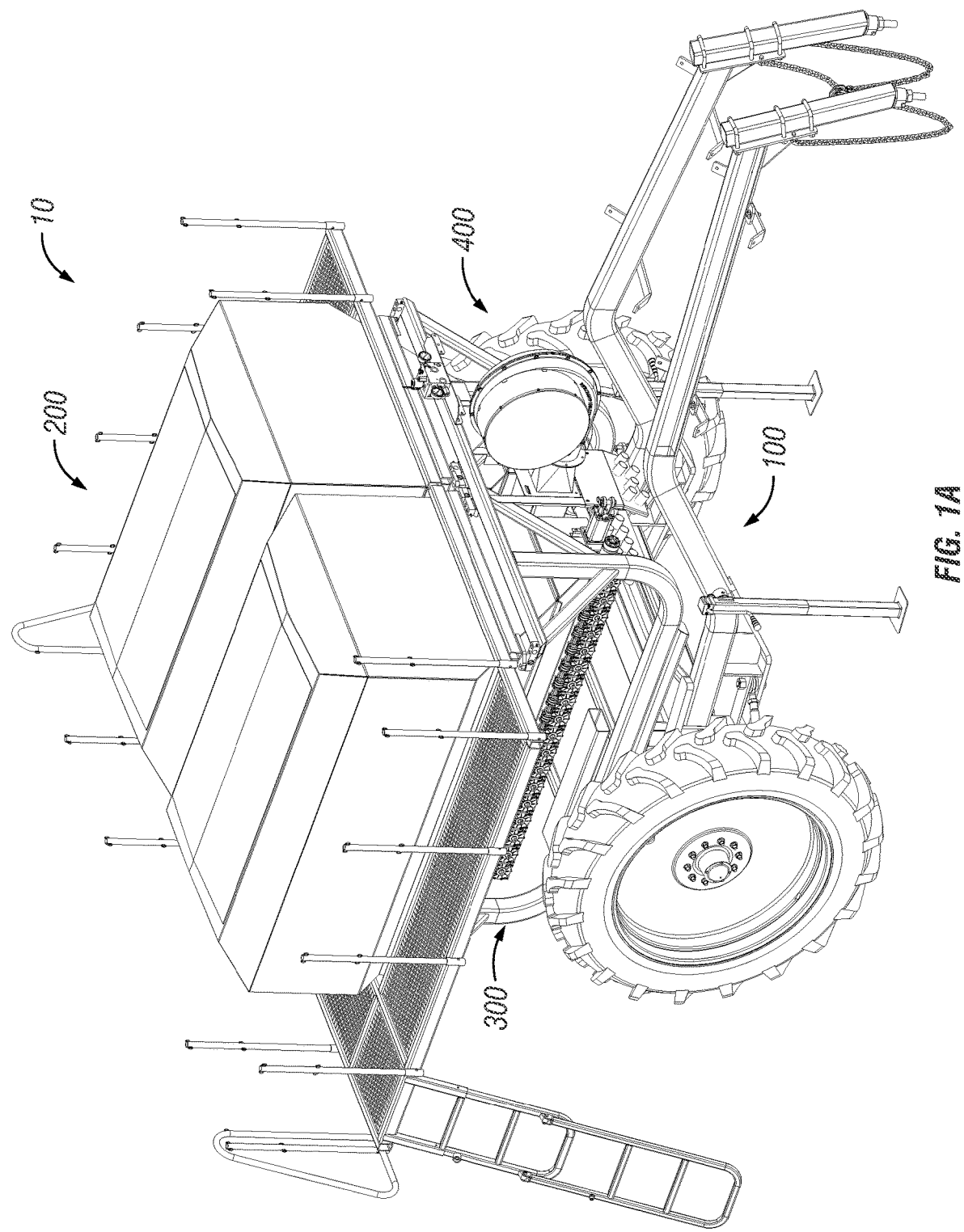
FIG. 1A is a front perspective view of a particulate metering implement in accordance with an illustrative embodiment.
Figure 1B:
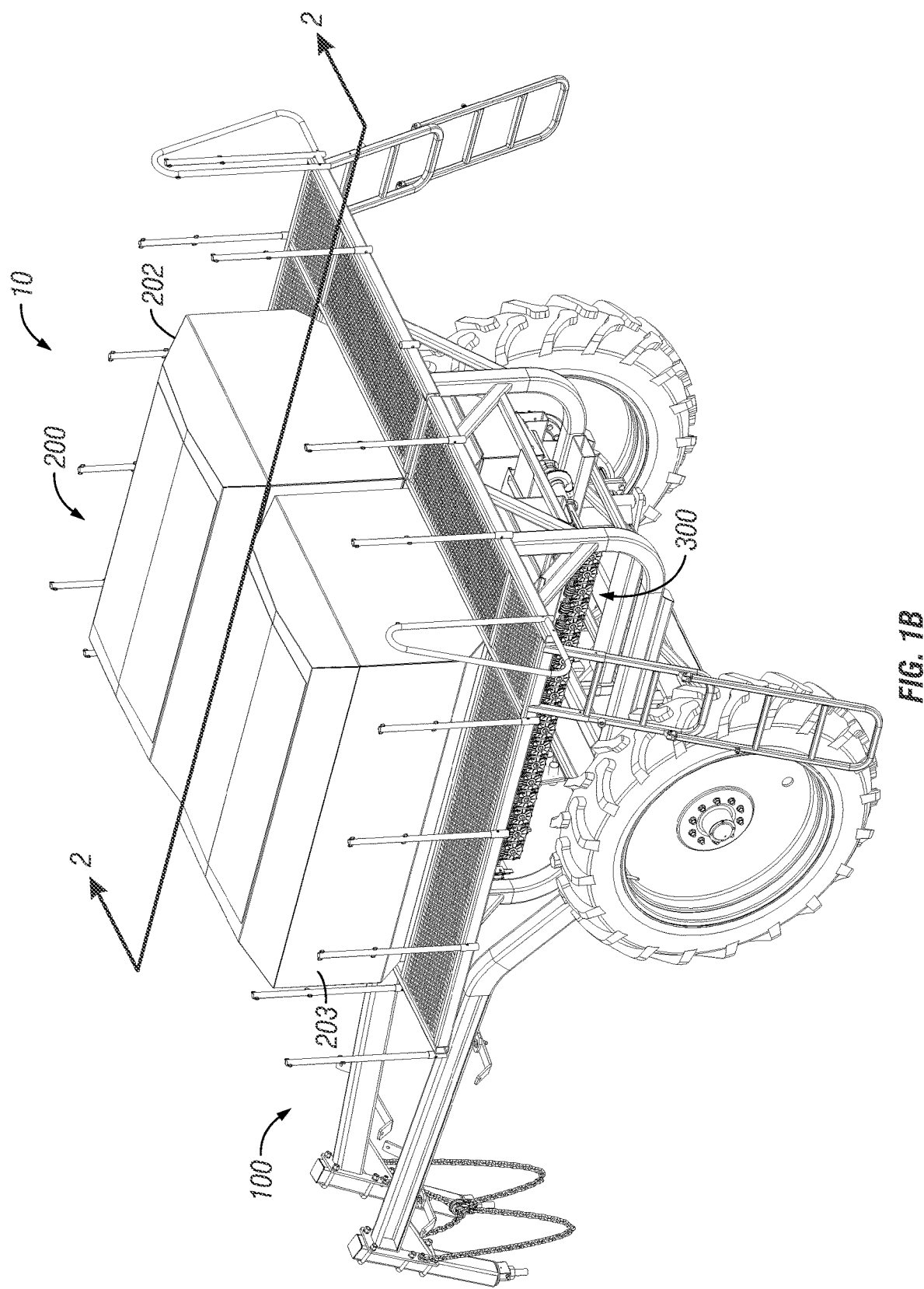
FIG. 1B is a rear perspective view of a particulate metering implement in accordance with an illustrative embodiment.

FIGS. 1A and 1B show a particulate metering implement 10. While the figure shows a particulate metering implement, it should be appreciated by those skilled in the art that the disclosure covers other types of implements, including but not limited to, seed meters, nutrient applicators, and other agricultural equipment. The implement 10 can be a towable trailer, as shown, or integrally formed with a particulate application system. As shown in conjunction with FIG. 2, the implement can include a frame assembly 100, particulate container assembly 200, particulate handling system 300, and air production system 400, air handling system 500, and particulate accelerator system 600.

Figure 1C:
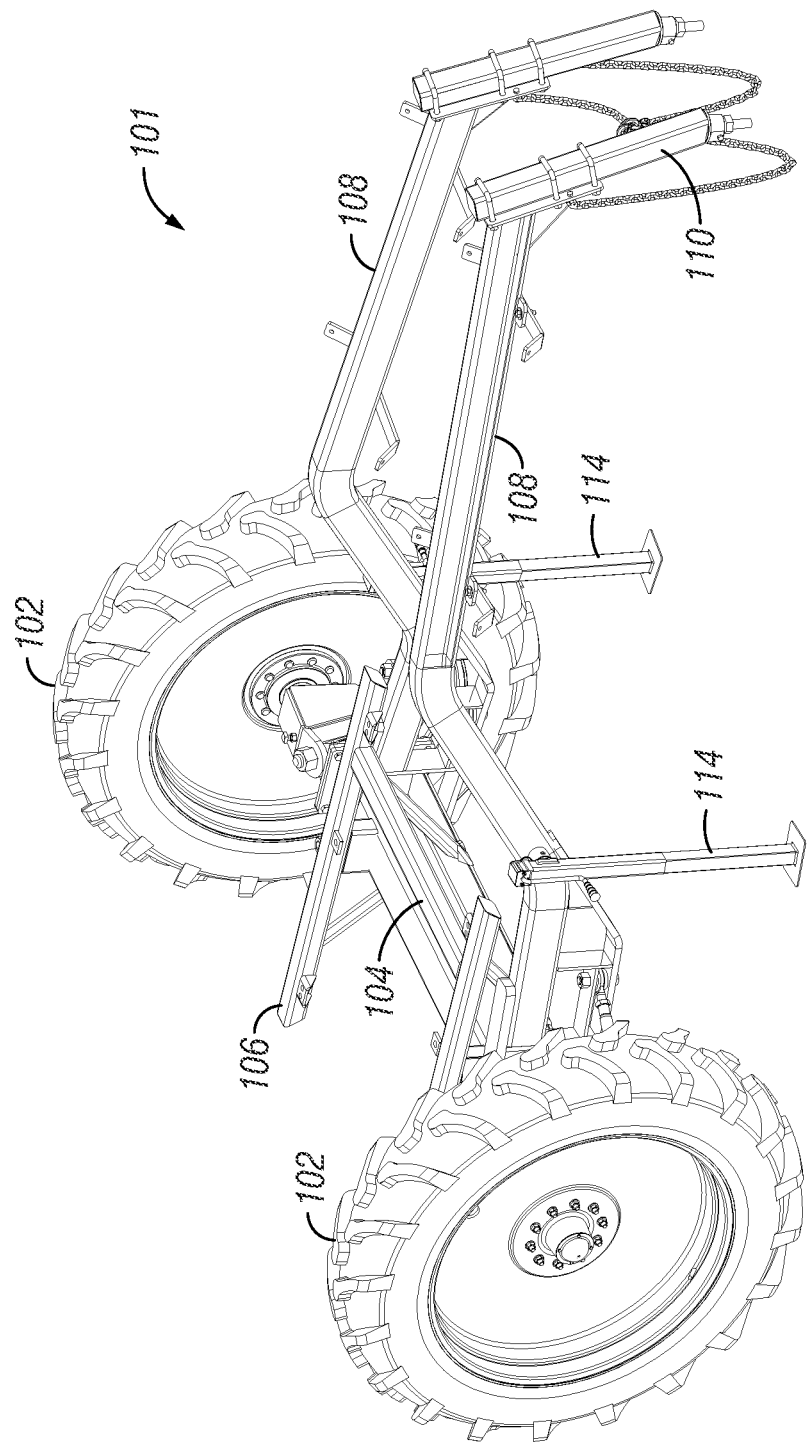
FIG. 1C is a front perspective view of a base frame assembly in accordance with an illustrative embodiment.
Figure 1D:
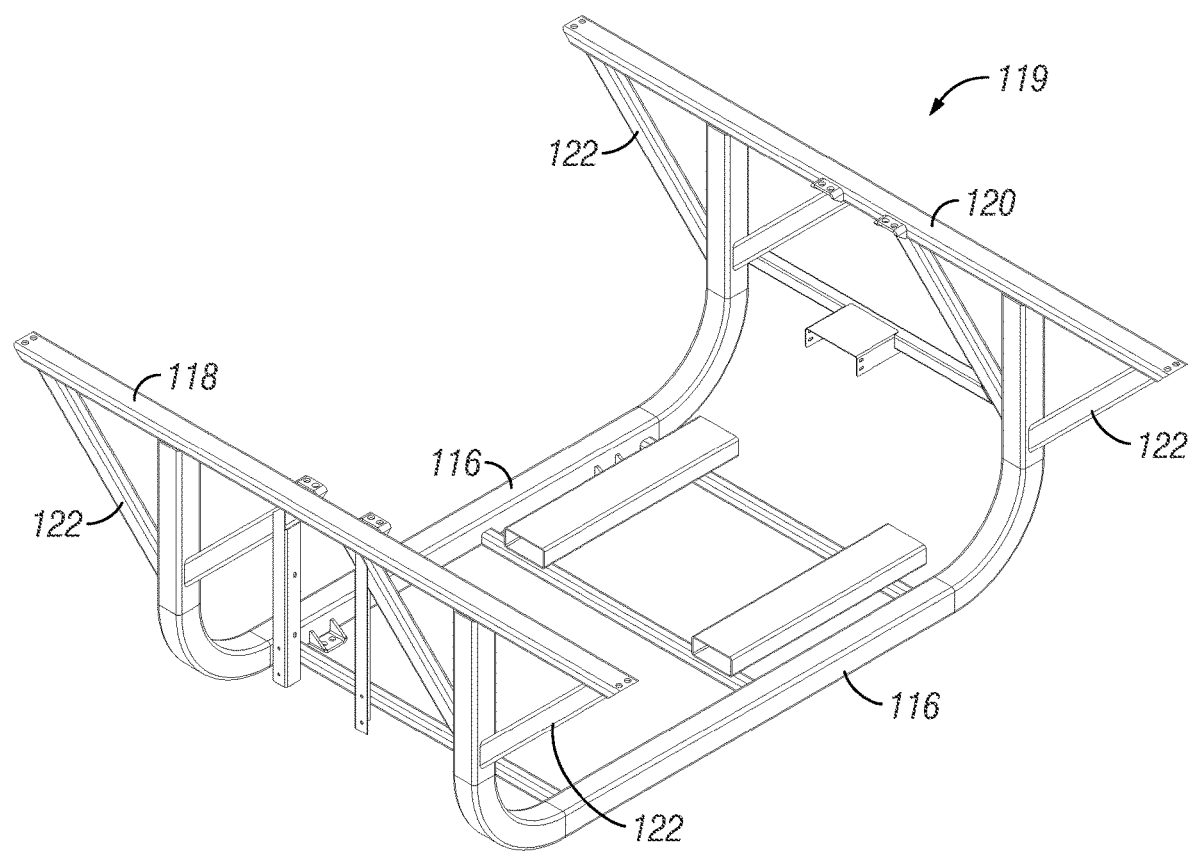
FIG. 1D is a front perspective view of an intermediate frame assembly in accordance with an illustrative embodiment.

Referring to FIGS. 1C and 1D, a base frame assembly 101 is provided. The base frame assembly 101 can include a plurality of wheels 102 to permit transportation of the implement 10. The implement 10 can be transported through other means commonly known in the art, including but not limited to, a tracking system, sled rails, spheres, or the like. The wheels 102 can be connected to a transverse base support member 104. The transverse base support member 104, together with two rear longitudinal base support members 106, can provide the primary support for intermediate frame assembly 119. Extending anteriorly from the transverse base support member 104 can be two front longitudinal base support members 108. The two front longitudinal base support members 108 can be shaped to not only connect to the base frame assembly 101 below the intermediate frame assembly 119, but also be connectable at a typical mounting height. The front longitudinal base support members 108 can be movably connected to coupling members 110. To support the implement 10 when not in use, vertical support members 114 can be adjustably lowered. The vertical support members 114 can be locked into position using a detent structure, transverse locking pin, or any means commonly known in the art. The implement 10 can be connected to a tractor, but the prevent disclosure contemplates additional operational environments, including but not limited to agricultural toolbars, trailers, other farm implements, and the like.

The intermediate frame assembly 119 can be mounted upon the base frame assembly 101. In particular, longitudinal intermediate support members 116 can be connected to rear longitudinal base support members 106. The longitudinal intermediate support members 116 can be generally U-shaped to elevate the particulate container (e.g., hopper) assembly 200 above the superior aspect of the wheels 102. The configuration can result in a front transverse intermediate support member 118 and a rear transverse intermediate support member 120 extending outwardly above the superior aspect of the wheels 102. The particulate container assembly 200 can be mounted on the front transverse intermediate support member 118 and a rear transverse intermediate support member 120. To provide additional support to the front transverse intermediate support member 118 and the rear transverse intermediate support member 120, a plurality of braces 122 can be provided. The braces 122 can create a truss-like structure between the longitudinal intermediate support members 116 and the transverse intermediate support members; however, the disclosure contemplates providing reinforcement through any means commonly known in the art.

As shown in FIG. 1B, the particulate container assembly 200 can be mounted on the frame assembly 100, and more particularly, the intermediate frame assembly 119. The particulate container assembly 200 can consist of two particulate containers 202 and 203. The disclosure envisions any number of particulate containers (e.g., hoppers) can be used. In an embodiment, the particulate containers 202 and 203 can be identical in structure and function, and symmetrical across Section 2-2 of FIG. 1B. In other embodiments, the one or more of the particulate containers can be modified without deviating from the objects of the disclosure. Hereinafter, discussion of particulate container 202 refers to particulate container 202 and its counterpart structure on particulate container 203.

Figure 3A:
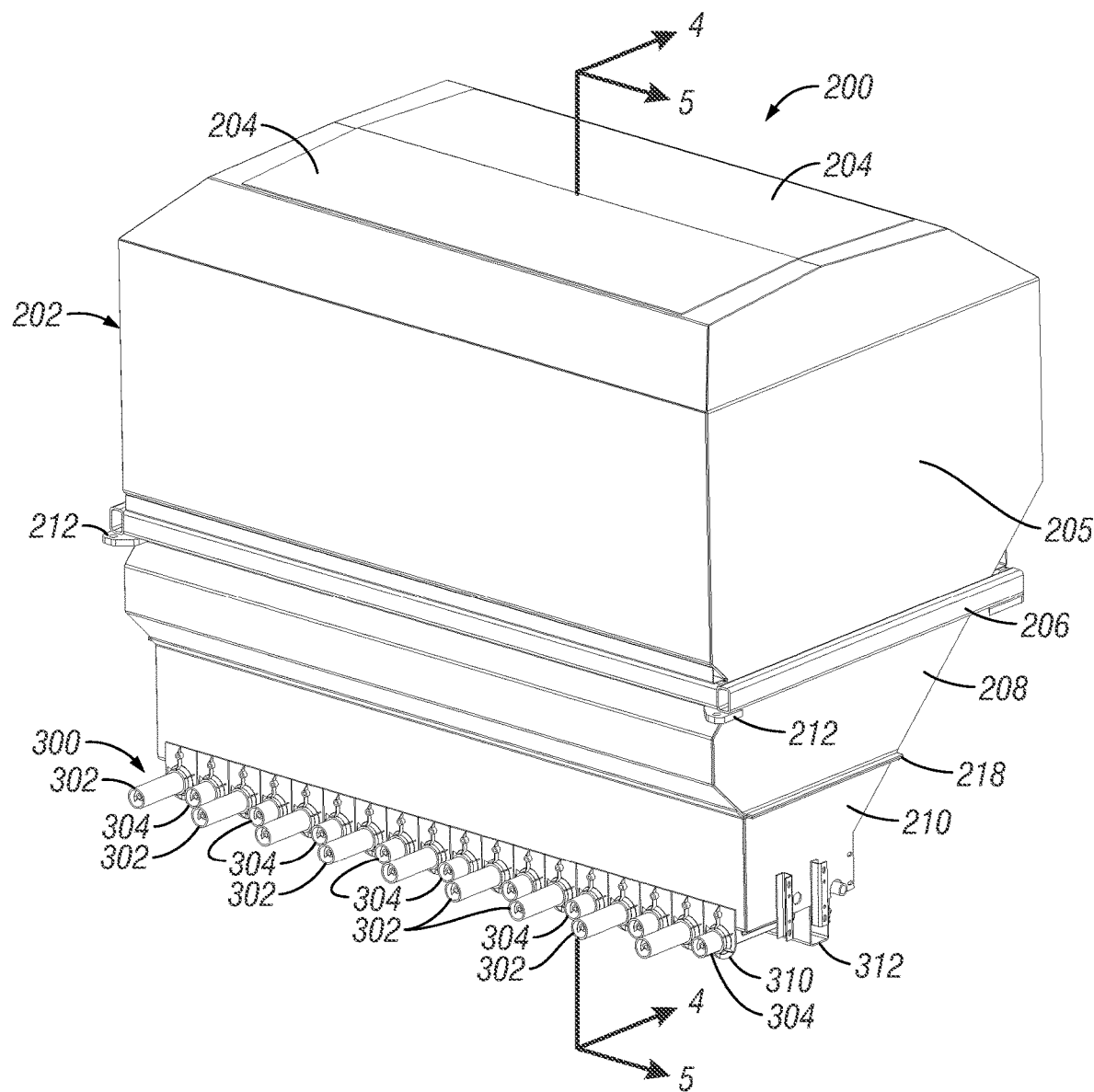
FIG. 3A is a front perspective view of a particulate container system in accordance with an illustrative embodiment.
Figure 3B:
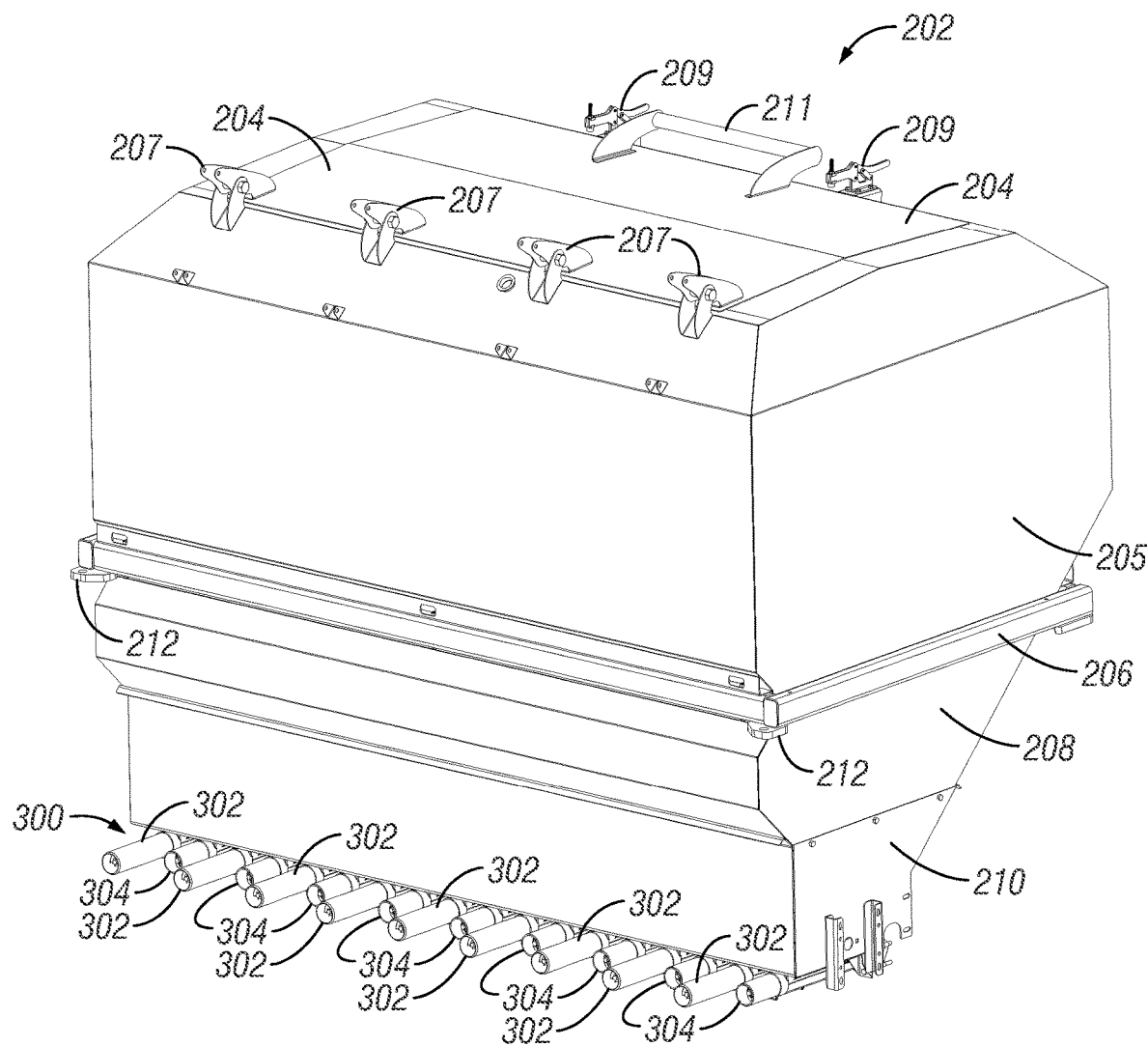
FIG. 3B is a front perspective view of a particulate container system in accordance with another illustrative embodiment.
Figure 4:
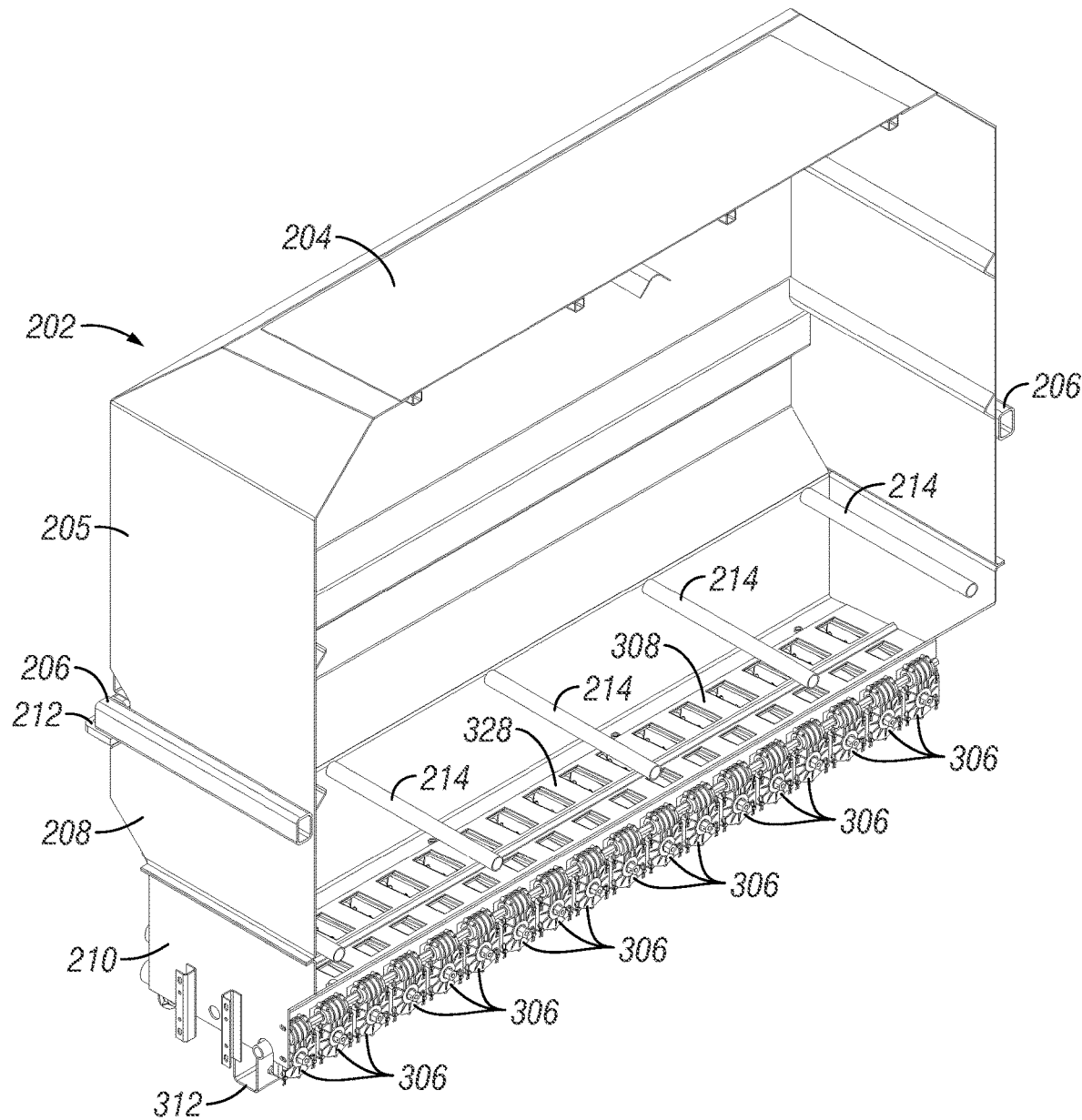
FIG. 4 is a cross-section view of the particulate container system of FIG. 3A taken along section line 4-4.
Figure 5:
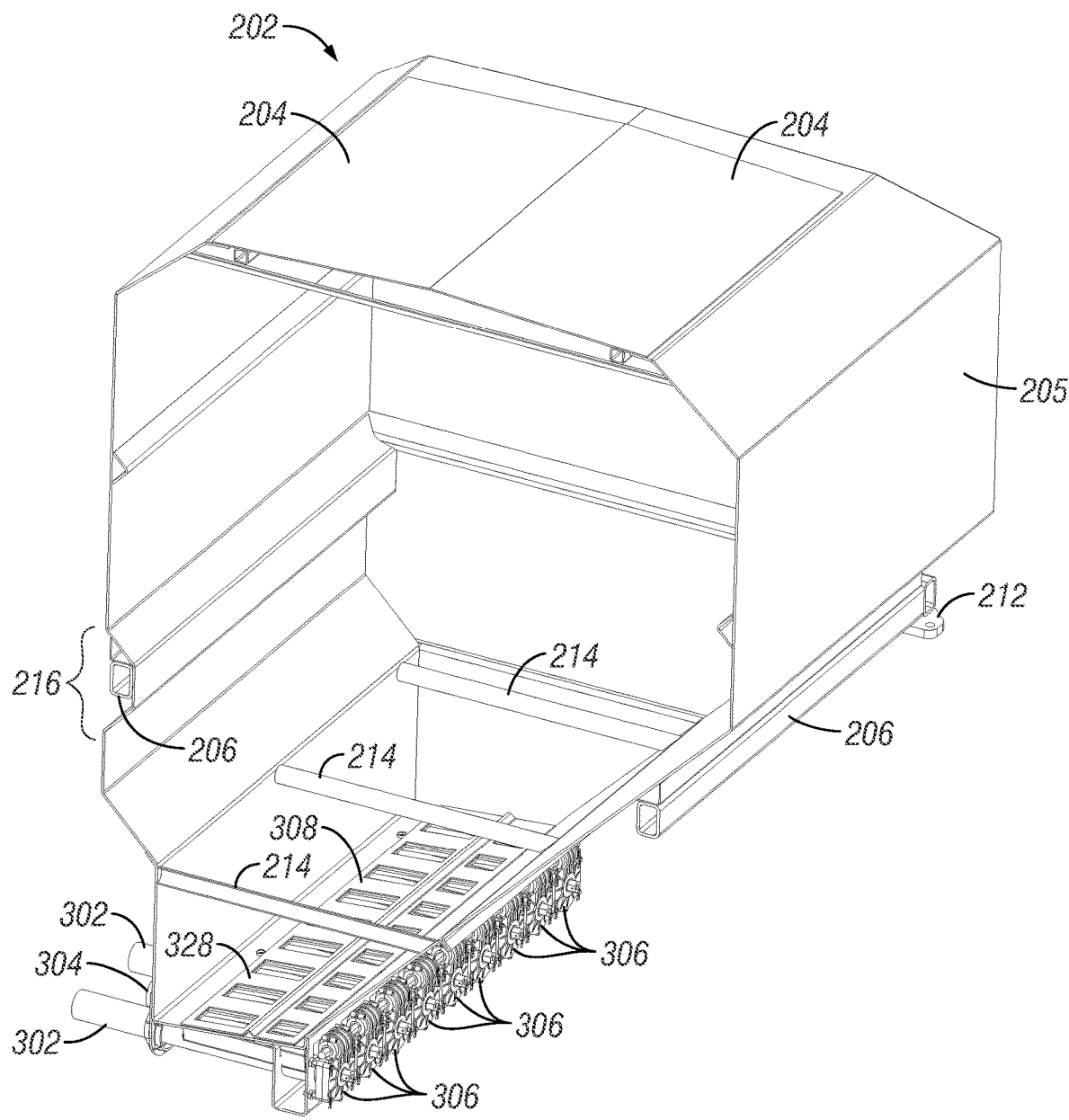
FIG. 5 is a cross-section view of the particulate container system of FIG. 3A taken along section line 5-5.

Referring to FIGS. 3A, 3B and 4, the particulate container 202 can include an upper portion 205, middle portion 208 and lower portion 210. The upper portion 205 can be a rectangular prism. The disclosure contemplates any shape that maximizes volume and/or permits the storage to extend above the wheels 102. A top surface of the upper portion 205 can include openings (not shown) covered by one or more lids 204. The lids 204 can be opened or removed to permit loading of particulate into the particulate container 202. The middle portion 208 can be a trapezium prism. The shape can assist in funneling the particulate to the lower portion 210. The transition from the upper portion 205 to the middle portion 208 can be generally demarcated by frame members 206 disposed around the perimeter of the middle portion 208 of the particulate container 202. The frame members 206 can have attachment means 212 to connect the particular container assembly 200 to the frame assembly 100, and more particularly, intermediate frame assembly 119. As shown in FIG. 5, the particulate container 202 can have a recessed area 216 on the side wall proximate to opposing particulate container 203. The recessed area 216 can prevent frame member 206 from extending past the plane of the side wall, which maximizes the volume of the particulate container 202 while minimizing the space required between the two particulate containers 202 and 203. For additional structural support, a plurality of internal support rods 214 (FIG. 4) can be provided within the interior of the particulate container 202.

In an embodiment illustrated in FIG. 3B, the one or more lids 204 can be pivotally connected to the particulate container 202 with one or more hinges 207. One or more clamps 209 can be mounted on the particulate container 202 proximate the opposing edge of the lids 204 to releasably secure the lids to the containers. To assist in opening the lids 204, a handle 211 can be connected to the lids 204 proximate to the clamps 209. Upon opening and/or removal of the lids 204, one or more screens (not shown) can be disposed within the openings of the particulate container 202 to prevent debris from entering the same.

Further, the clamps 209 can provide an airtight seal between the lids 204 and the particulate container 202. In such an embodiment, the airtight seal can permit the particulate container 202 to be pressurized. In one representative example, the particulate container 202 can be pressurized to ten, fifteen, twenty or greater inches of water (in $H_2O$). The pressurization can assist in guiding the particulate to the particulate handling system 300, provide for improved control of quantities dispensed to the particulate handling system 300, and/or provide for improved control of the environment in which the particulate is housed.

Figure 6A:
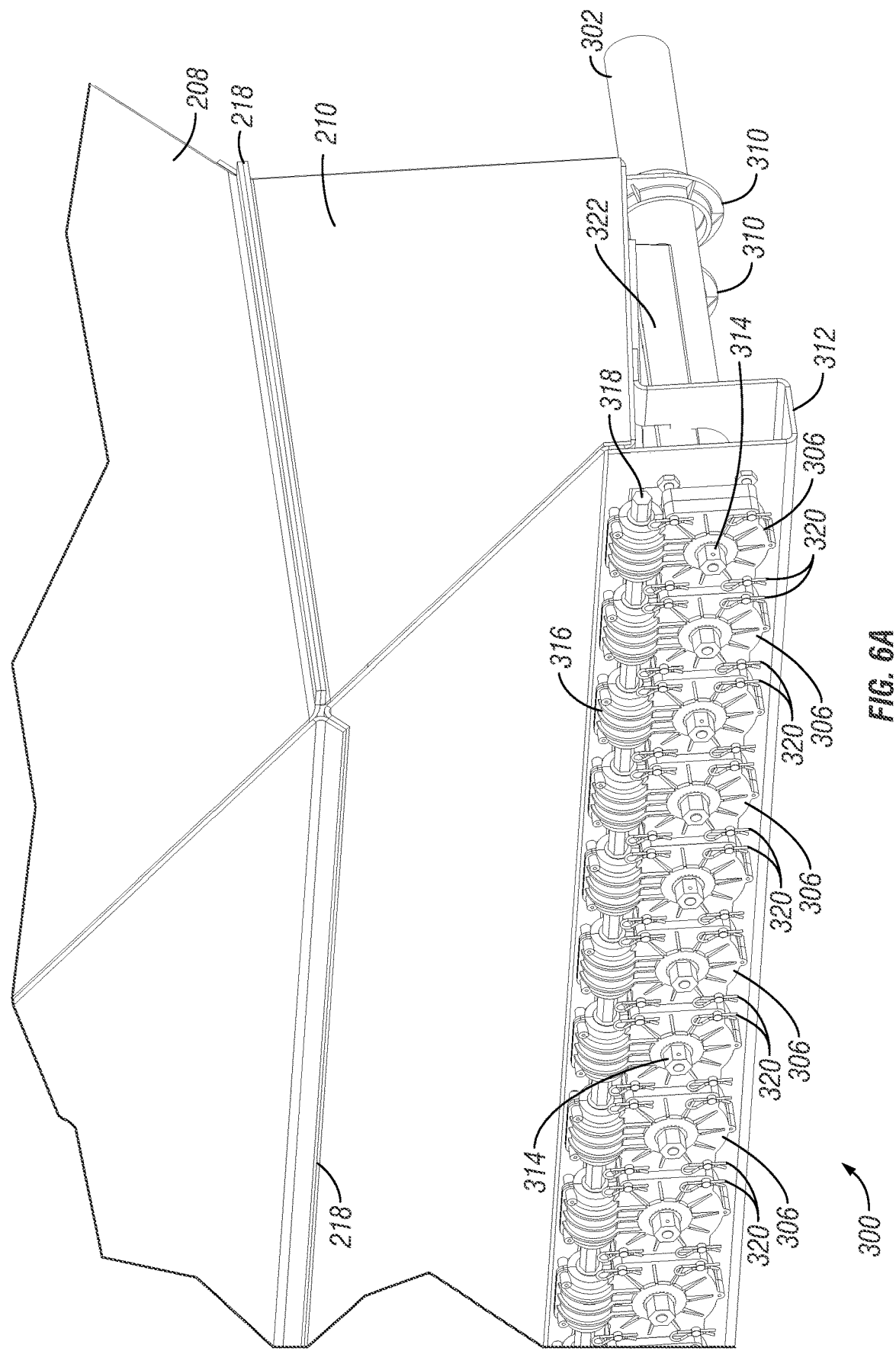
FIG. 6A is a front perspective view of a portion of a particulate handling system in accordance with an illustrative embodiment.

The lower portion 210 and the middle portion 208 of particulate container 202 can be separated by joining flanges 218, as shown illustratively in FIGS. 3A and 6A. The joining flanges 218 can include material extending from the lower portion 210 and the middle portion 208, which are then joined by welding or any means commonly known in the art. The lower portion 210 can be a trapezium prism to assist in funneling the particulate to the particulate handling system 300.

The particulate container 202 can include a bottom tray 328. As shown in FIGS. 8 and 9, the bottom tray 328 can include a plurality of gates 308 arranged along the length of the tray 328. The gates can be square and/or rectangular, as shown, or can be of any shape to permit particulate to enter the particulate delivery system 300. Similarly, the gates can all be the same shape and/or size, or of varied shapes and/or sizes based on the application. The interstitial portions of the bottom tray 328 can be flat, as shown, or can have a wedged-shape configuration to funnel particulate to the plurality of gates 308. The bottom tray 328 can be integrally connected to the bottom portion 210 of the particulate container 202, or can be removable to permit a user to quickly install a different bottom tray 328 based on the application. The plurality of gates 308 can further include smaller gates 324 and larger gates 326 separated by a raised portion 330. The raised portion 330 can funnel the particulate into the smaller gates 324 and the larger gates 326 and/or add structural support along the length of the bottom tray 328. Separating the particulate into a pair of gates (smaller gate 324 and larger gate 326) can minimize undesirable torqueing of the augers 332 (FIGS. 11A and 12B) and/or the auger motor(s) 344 (FIGS. 22 and 23), particularly during initialization of the particulate handling system 300.

One or more scales (not shown) can be associated with each of the particulate containers 202 and 203 (FIG. 4). The scales can be operatively connected to a control system and configured to weigh each of the particulate containers 202 and 203. Together with one or more sensors associated with one or more transmissions 306 discussed below, the system can provide real-time and/or post-operation feedback of the expected volume of particulate dispensed versus actual volume of particulate dispensed for each unit row of the field and/or for the overall particulate metering implement 10. In an embodiment utilizing real-time feedback, the control system can make adjustments based on the data provided. Further, the data can be used by the control system to diagnose dysfunctional augers 332 and/or auger motor(s) 344, and/or identify potential blockages of particulate within the particulate metering implement 10.

A plurality of moveable and/or controllable gate covers (not shown) can be installed on the plurality of gates 308 to prevent particulate from filling the short auger tubes 304 and the long auger tubes 302 while not in use, which can minimize undesirable torqueing on the augers 332 and/or the auger motor(s) 344 during initialization of the particulate handling system 300. After the augers 332 and the auger motor(s) 344 are operating at a sufficient speed and torque, the gate covers can be opened to permit particulate to enter the plurality of gates 308.

Figure 10A:
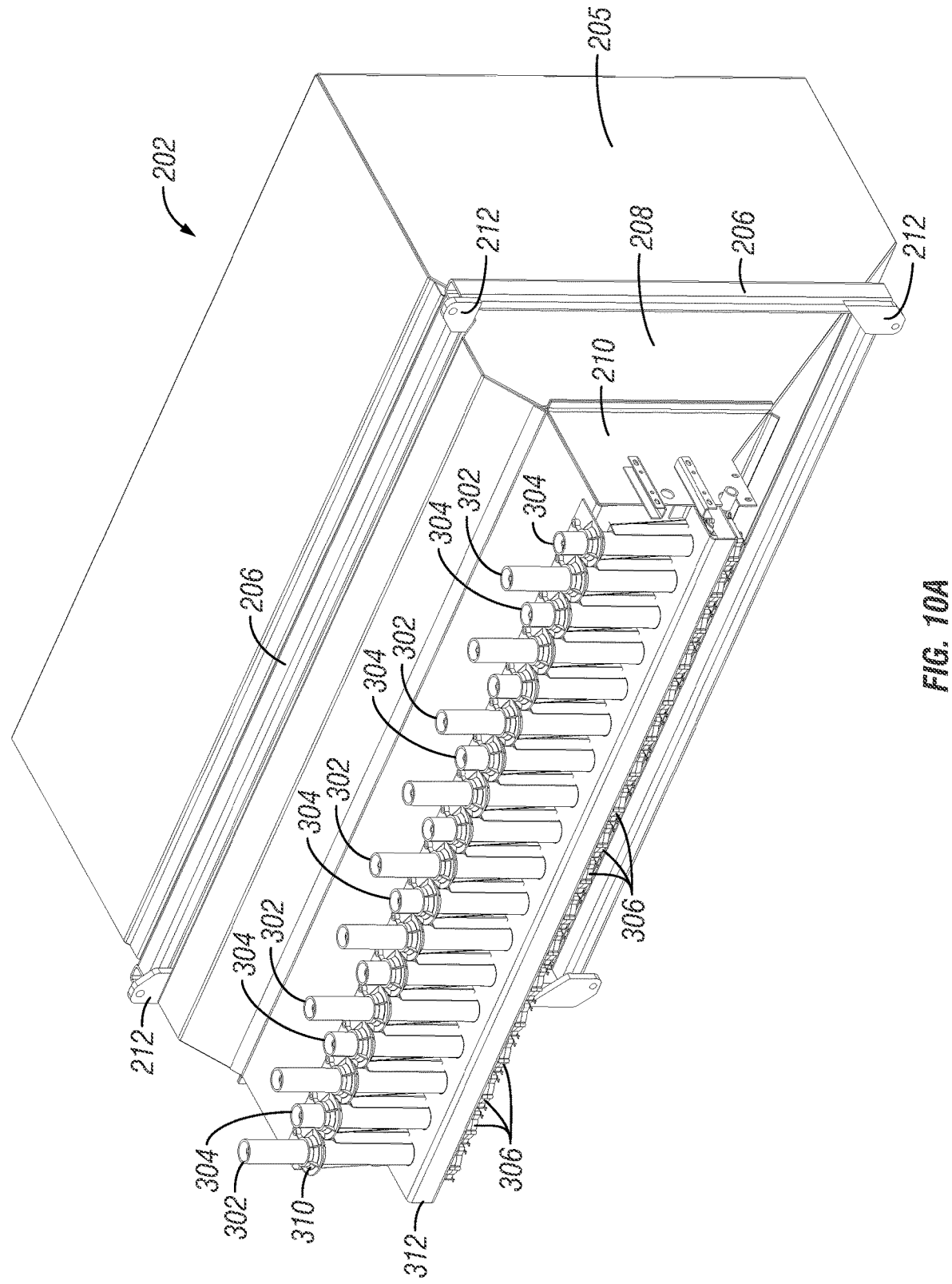
FIG. 10A is a bottom perspective view of a particulate container system in accordance with an illustrative embodiment.

Referring to FIGS. 3A, 3B and 10A, the particulate delivery system 300 can include a plurality of long auger tubes 302 and a plurality of short auger tubes 304 disposed below the bottom tray 328 of the particulate container 202. The plurality of long auger tubes 302 and a plurality of short auger tubes 304 can be constructed in two halves for ease of manufacturing, but the present disclosure also contemplates a unitary construction.

Figure 10B:
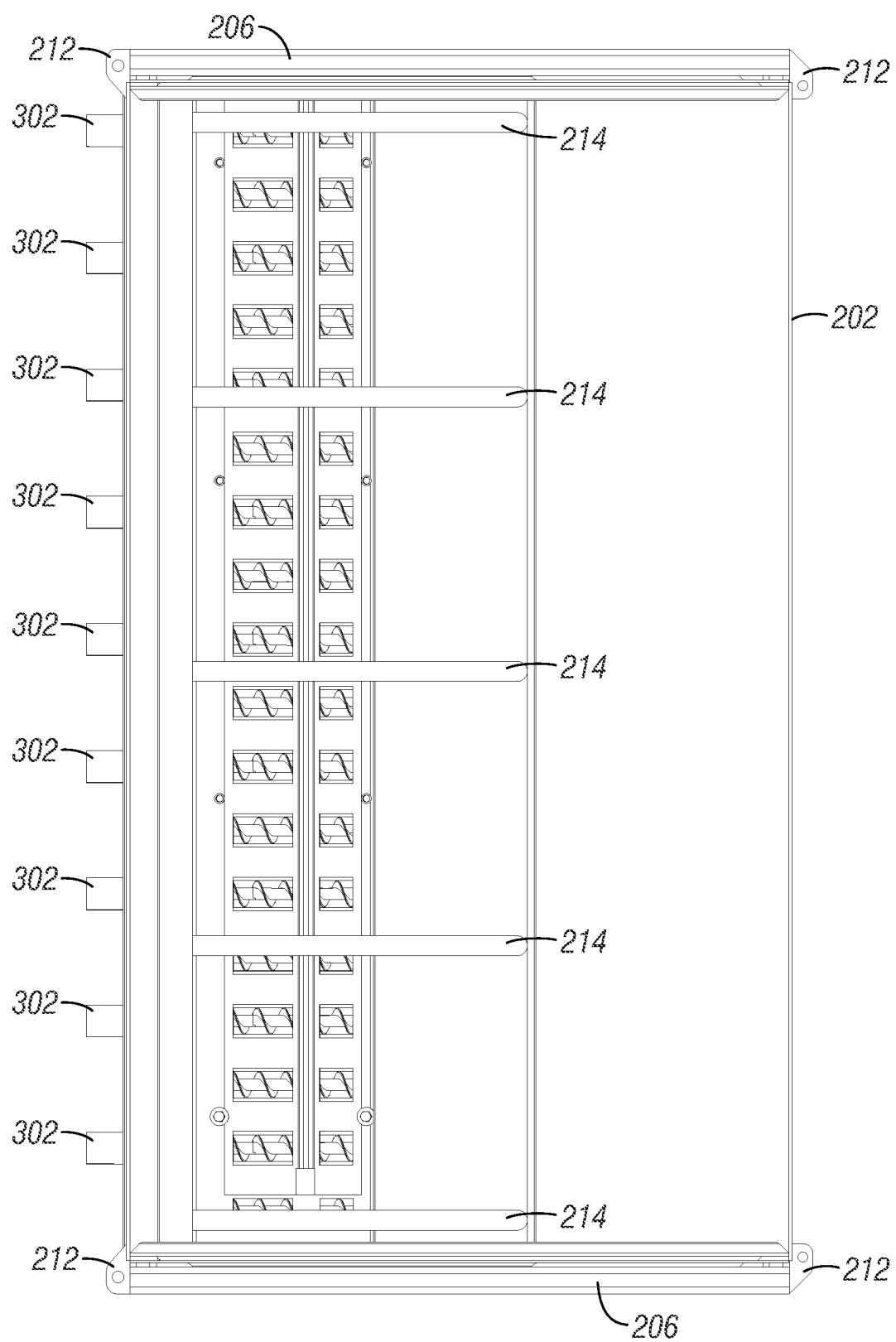
FIG. 10B is a top plan view of a particulate container system in accordance with an illustrative embodiment.
Figure 11A:
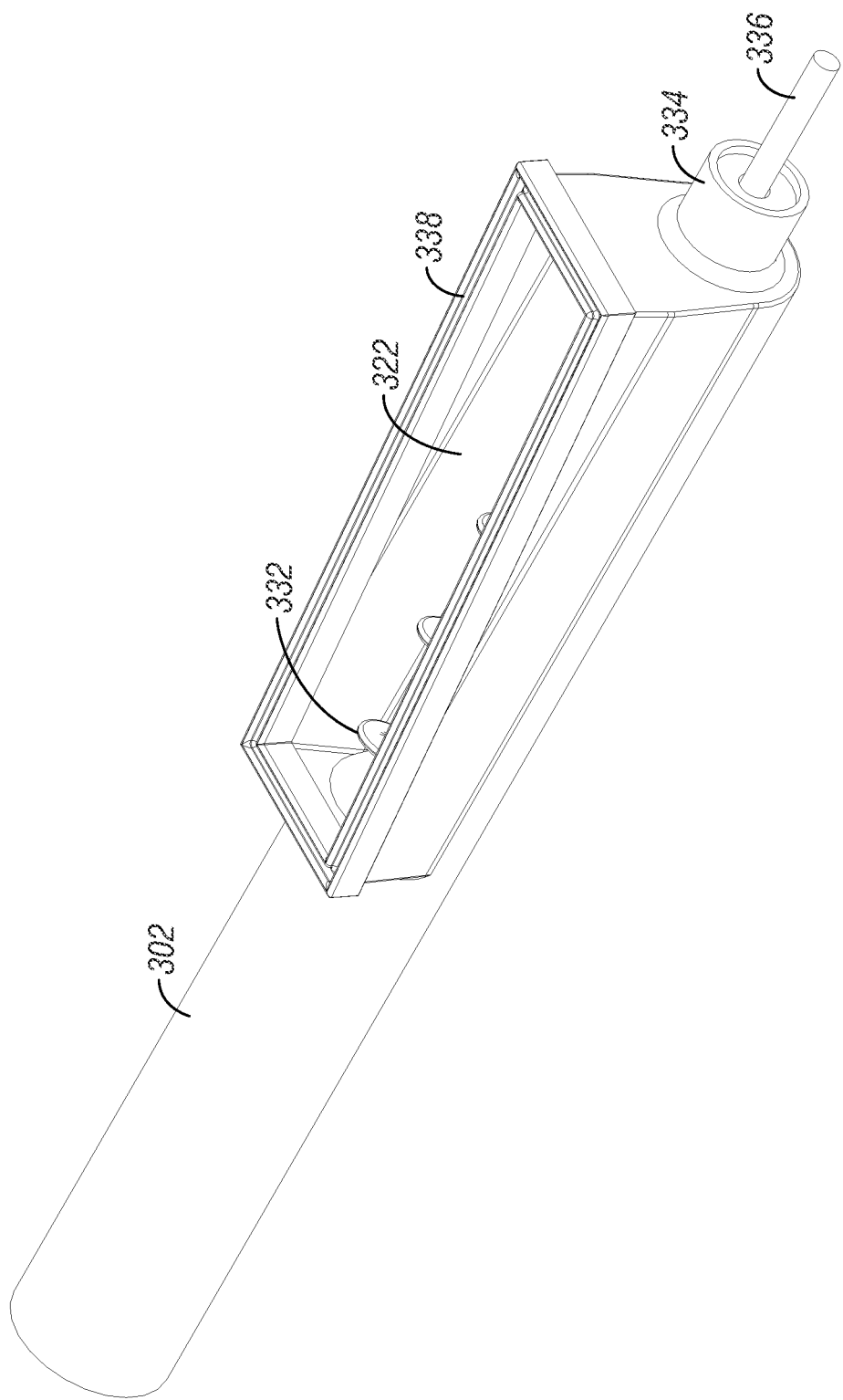
FIG. 11A is a front perspective view of a long auger tube in accordance with an illustrative embodiment.

Each of the plurality of long auger tubes 302 and the plurality of short auger tubes 304 can have an input slot 322 disposed within the tubes in a position proximate to the bottom tray 328. Referring to FIGS. 5, 10B and 11A, the input slots 322 can be sized and shaped to receive particulate passing through the plurality of gates 308 in the bottom tray 328. An input slot interface 338, including a gasket, as shown in FIG. 11A, can seal the auger tubes 302 and 304 to the inferior side of bottom tray 328.

Figure 2:
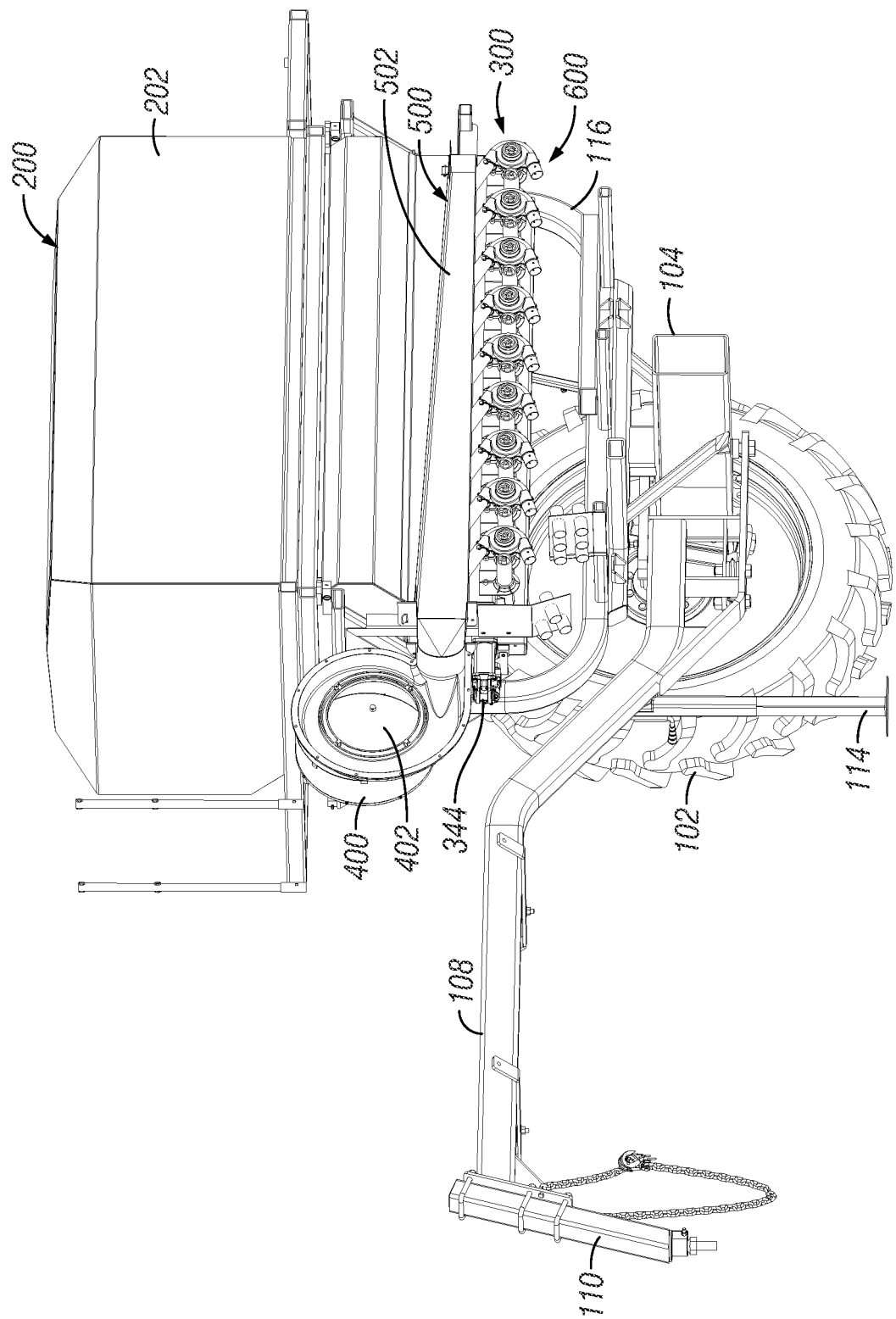
FIG. 2 is a cross-section view of the particulate metering implement of FIG. 1B taken along section line 2-2.

An auger motor 344, as shown in FIG. 2, can provide a rotational force to an input shaft 318, as shown illustratively in FIG. 6A. The input shaft 318 can span the length of the particulate container 202 and be configured to connect to a plurality of transmission input shaft receivers 316 to drive a plurality of transmissions 306. The plurality of transmissions 306 can be mounted on the auger tube support beam 312. The plurality of transmissions 306 can be connected through pins 320 or any other means of connection commonly known in the art. Referring to FIGS. 11A and 11B, an auger 332 contained within the auger tubes 302 and 304 can be connected to a transmission 306 with a shaft 314 disposed on the side opposite the auger. The speed and torque of the plurality augers 332 can be determined by the speed and torque provided by the auger motor 344 via the plurality of transmissions 306. In an embodiment, a sensor (not shown) monitors the revolutions per minute (RPM) of the shafts 314.

In an embodiment, motors can be connected to and power each of the plurality of augers 332. In such an instance, the plurality of transmissions 306, as shown in FIG. 6A, can be replaced with a plurality of motors mounted on the auger tube support beam 312 or any other suitable location. Each of the plurality of motors can be operatively connected to a control system to generate desired speed of each auger 332, of a group or bank of augers 332, or of all augers 332.

Figure 13:
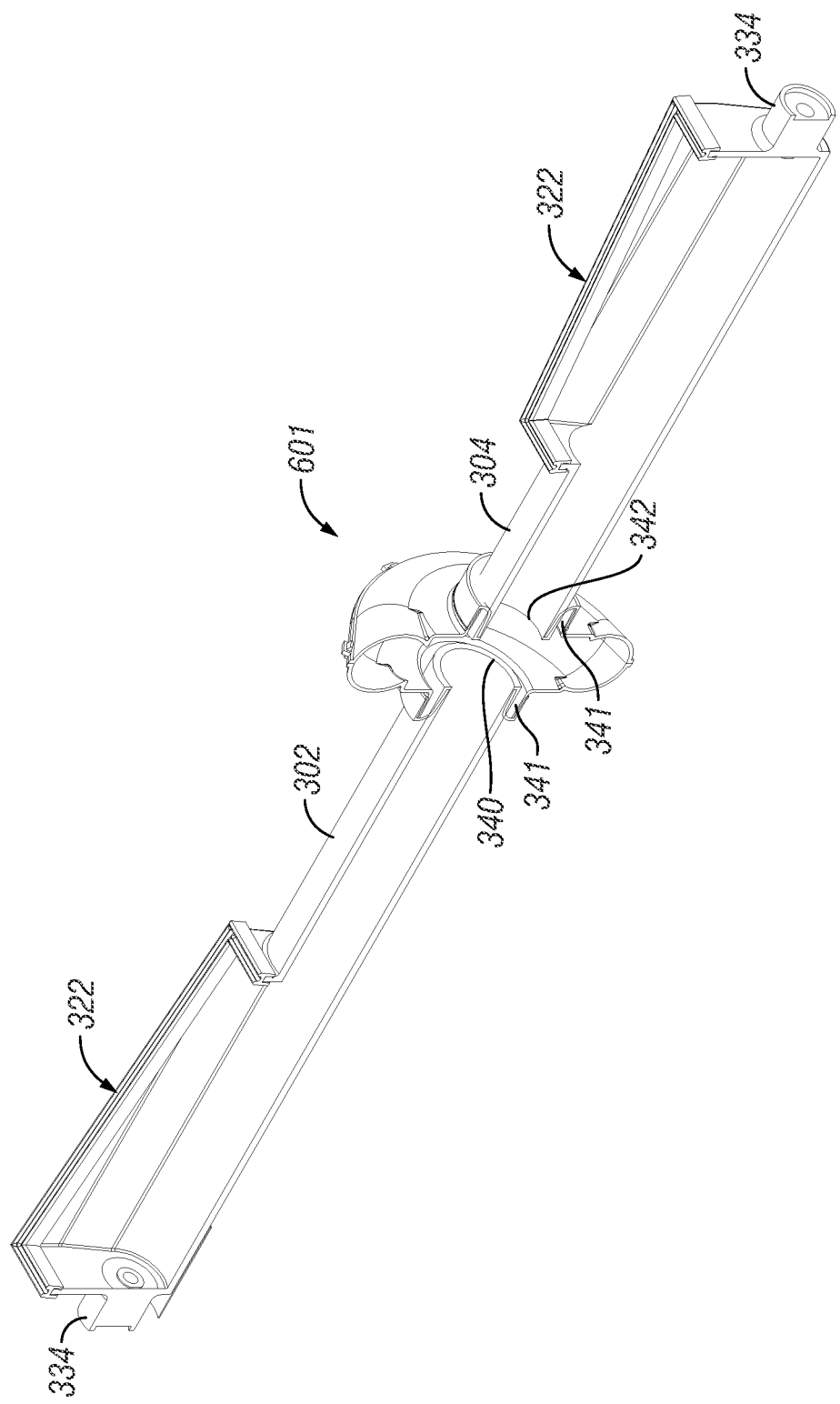
FIG. 13 is a cross-sectional view of the particulate accelerator and partial particulate handling systems of FIG. 12B taken along section line 13-13.

The particulate contained in the particulate container 202 passes through the plurality of gates 308 and the input slot 322 of a long auger tube 302. Referring to FIGS. 6A, 11A, 11B and 11C, an auger drive shaft 336 can be rotatably connected to a transmission 306 by a bearing 334. Upon receiving an input force from the auger motor 344 via a transmission 306, the auger drive shaft 336 rotates the auger 332. The helical nature of the auger 332 can transmit the particulate contained within the long auger tube 302 towards a long auger tube-particulate accelerator interface edge 340, as shown in FIG. 13. The process described above can also occur for the plurality of short auger tubes 304. Specifically, the auger 332 can transmit the particulate contained within short auger tube 304 towards a short auger tube-particulate accelerator interface edge 342. While the embodiment can utilize an auger, it should be appreciated by those skilled in the art that the disclosure covers other means of transmitting the material through a tube, including but not limited to, hydraulic pistons, pneumatics, and the like.

A gasket 341 can provide a seal proximate to the long auger tube-particulate accelerator interface edge 340 and the short auger tube-particulate accelerator interface edge 342. The gasket 341 can permit the short auger tube 304 and long auger tube 302 to flex within the particulate accelerators due to movement of the system as the particulate containers 202 and 203 are emptied, experience vibration, and the like.

Figure 6B:
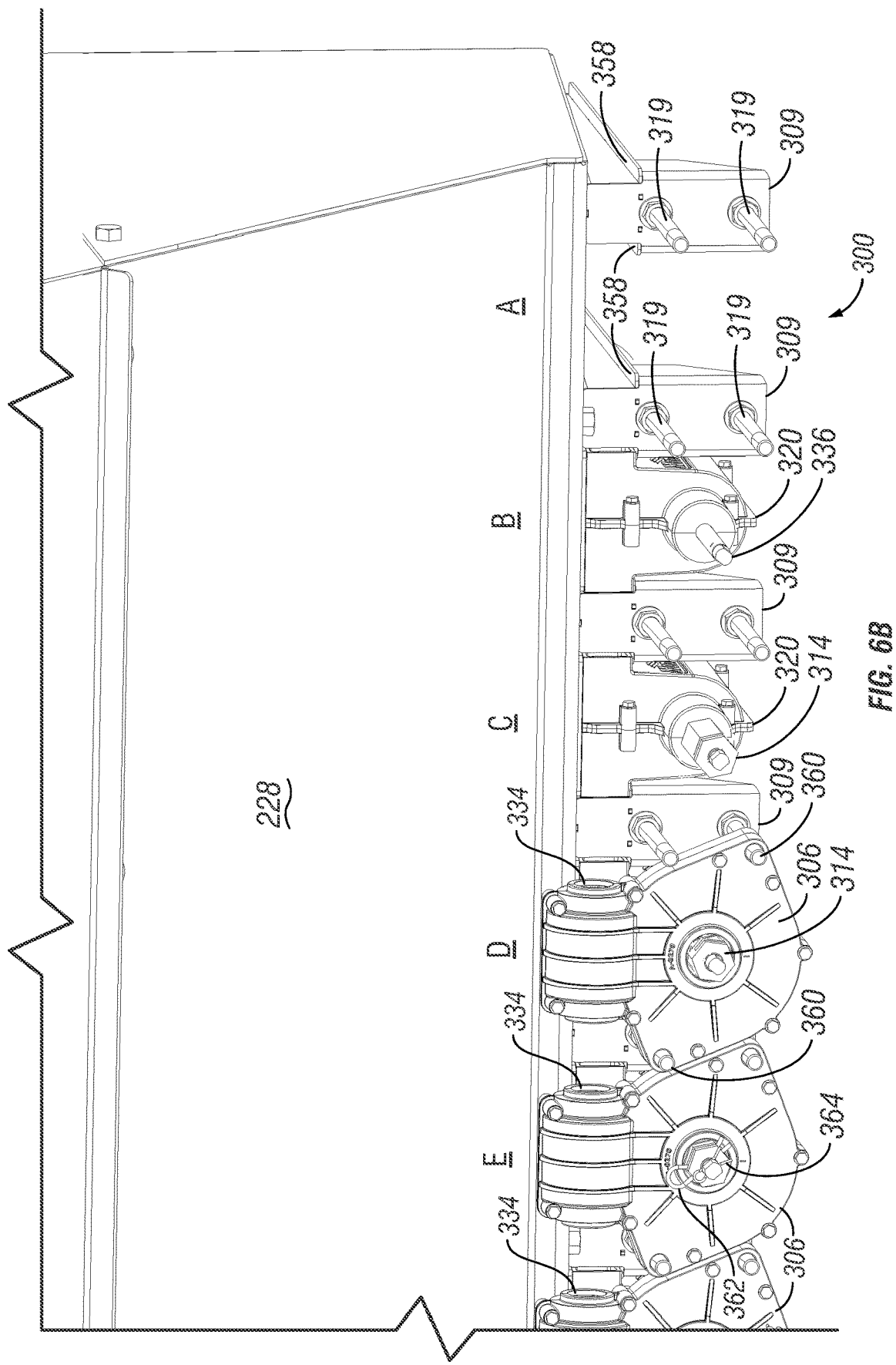
FIG. 6B is a front perspective view of the particulate handling system at various stages of installation in accordance with an illustrative embodiment.
Figure 7:
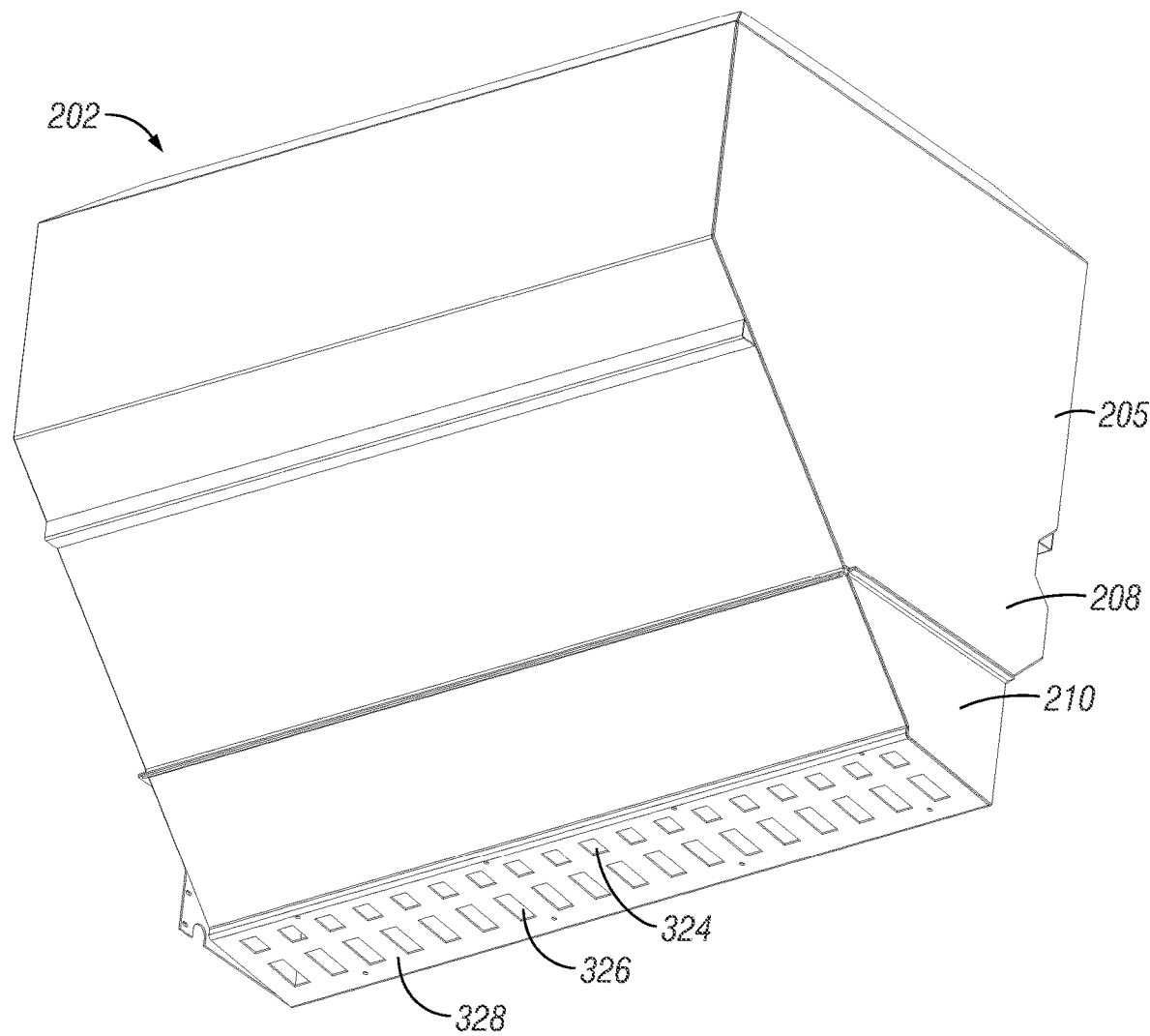
FIG. 7 is a bottom perspective view of a particulate container in accordance with an illustrative embodiment.

In an embodiment best shown in FIG. 6B, each of the plurality of long auger tubes 302 and a plurality of short auger tubes 304 can be disposed between two hangars 309 affixed to the bottom section 228 of the particulate container 202. The hangars 309 can be welded to the container, or can be affixed by any means commonly known in the art, including but not limited to, nut and bolt, screws, rivets, soldering, and the like. Extending outwardly along the length of the hangars 309 can be two guide surfaces 358. As discussed below, a guide surface 358 from adjacent hangars 309 can be adapted to receive a long auger tube 302 or a short auger tube 304. The hangars 309 can include two parallel prongs 319 extending outwardly from a front surface of the hangars 309. The prongs 319 can be cylindrical or can be of any shape commonly known in the art to engage and/or secure a transmission 306. Further, while two prongs 319 are shown in FIG. 6B, the present disclosure contemplates any number of prongs without deviating from the objects of the disclosure.

FIG. 6B further illustrates a plurality of particulate handling systems 300 at various stages of installation. Beginning below so-called Sector A, two hangars 309 can be connected to the bottom surface of the particulate container 202, as discussed above. The hangars 309 can be parallel to one another and spaced to provide for installation of a long auger tube 302 or short auger tube 304. The long auger tube 302 or short auger tube 304 can be installed by sliding a lower surface of the input slot 322 along guide surfaces 358, one from each of the adjacent hangars 309, as shown illustratively below Sector B. The advantageous design permits for ease of installation as well as removal and reinstallation should a long auger tube 302, short auger tube 304 and/or an auger 332 needs to be repaired or replaced with the same or different component. As illustrated below Sector C, a shaft 314 can be installed over the auger drive shaft 336. The installation of the shaft 314 over the auger drive shaft 336 can occur either before or after the long auger tube 302 or short auger tube 304 has been installed between hangars 309. Thereafter, a transmission 306 can be oriented such that mounting holes 360 are aligned with the prongs 319 on the hangars 309, as shown illustratively below Sector D. After installation of the transmission 306 on the shaft 314, a pin 362 can be installed to rotatably engage auger drive shaft 336 and the shaft 314, and a pin 364 can be installed to axially secure the shaft 314 on auger drive shaft 336, as shown illustratively below Sector E. Further, securing means commonly known in the art can be used to secure the transmission 306 to the prongs 319. The installation process described above can be repeated for each row unit along the length of each of the particulate containers 202 and 203. The input shaft 318 can extend through and engage the plurality of transmission receivers 316 in each of the transmissions 306.

Each of the transmissions 306 can have a clutch (not shown) in operable communication with a control system. At the direction of the user or based on instruction from the particulate metering system 10, the control system can engage/disengage one or more predetermined clutches in order to activate/deactivate the associated one or more screw conveyors.

As shown illustratively in FIG. 6B, and more particularly below Sector D, each of the two prongs 319 of the one hangar 309 can be connected to adjacent transmissions 306. In other words, an upper prong of a hangar can be connected to one gearbox while a lower prong of the same hangar can be connected to an adjacent gearbox. The arrangement is due to an advantageous design of the transmissions 306, which can permit one or more transmissions 306 to be removed, inverted and reattached to the same two prongs as previously connected. The inversion of a transmission 306 can provide several advantages over the state of the art. First, in an inverted position, one or more of the transmissions 306 can be disengaged from the input shaft 318 based on the needs of the application (e.g., in at least one instance, where one or more of the rows in the field does not require particulate metering). Second, a second input shaft (not shown) can be implemented and adapted to engage the one or more transmissions 306 placed in an inverted position (e.g., in another instance, one or more of the rows can be metered at a different rate). The second input shaft can also extend the length of the particulate container 202 and can be parallel to the input shaft 318. In such an embodiment, the user can invert one transmission or can invert multiple transmissions to permit desired groupings of the same (e.g., every four transmissions, every other transmission, etc.) based on the needs of the operation and/or application. Furthermore, together with the same opinion for the companion particulate handling system 300 associated with the second particulate container 203, the potential configurations can permit precise control over the blends of the particulate from the containers as well as application rates in which the blends are metered.

In an alternative embodiment, the plurality of long auger tubes 302 and the plurality of short auger tubes 304 can be secured below the bottom tray 328 by an auger tube support beam 312 and auger tube couplers 310, as shown illustratively in FIGS. 3, 5, 6A and 10A. The auger tube support beam 312 can be generally-U shaped with a plurality of cylindrical openings, as shown in FIG. 6A. The auger tube couplers 310 can be substantially ring-shaped with a flange configured to connect to the lower portion 210 of particulate container 202, as shown illustratively in FIG. 3A.

Figure 14:
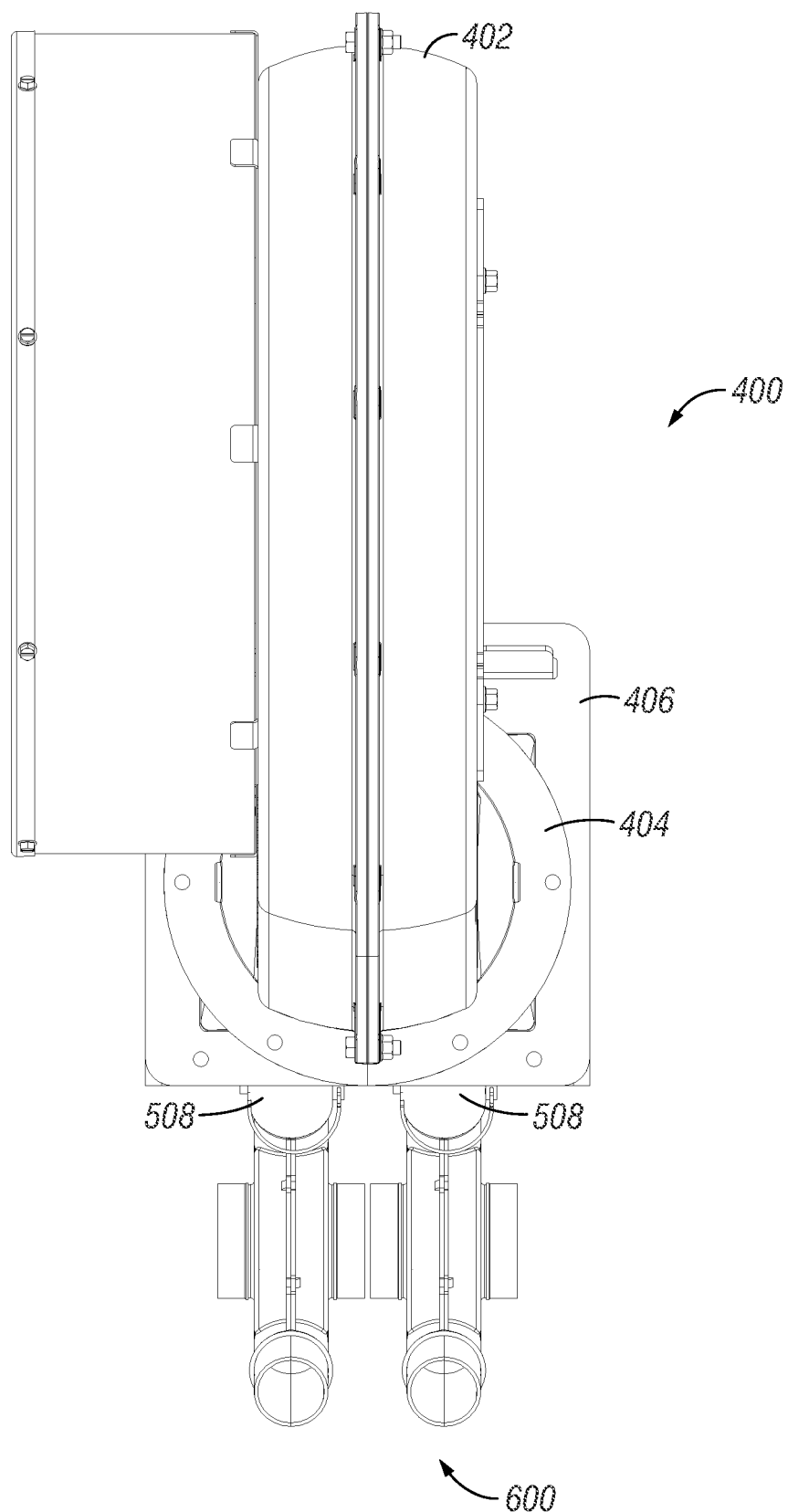
FIG. 14 is a front elevation view of an air production system, air handling system and particulate accelerator system in accordance with an illustrative embodiment.
Figure 15A:
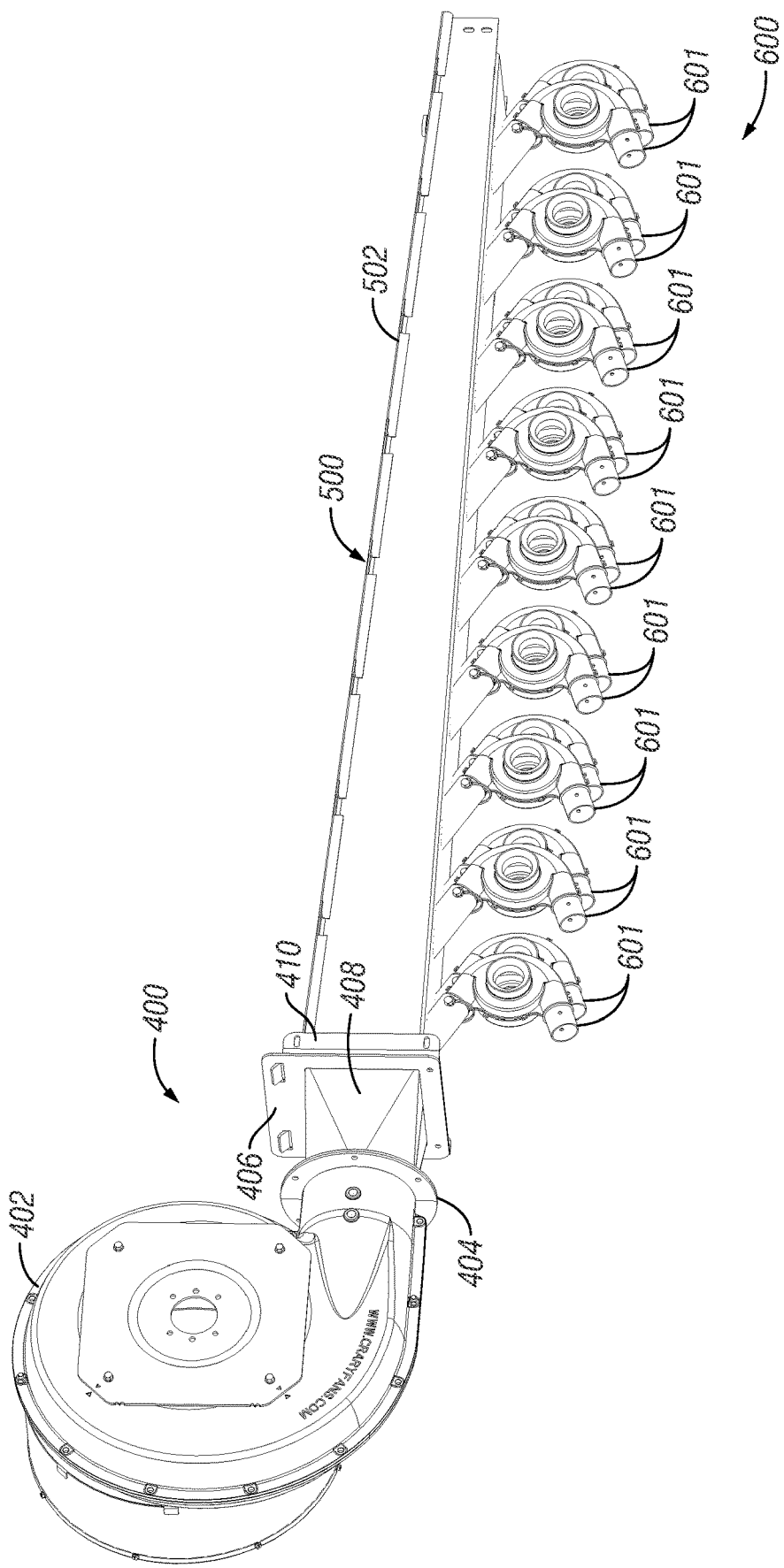
FIG. 15A is a front perspective view of an air production system, air handling system and particulate accelerator system in accordance with an illustrative embodiment.
Figure 15B:
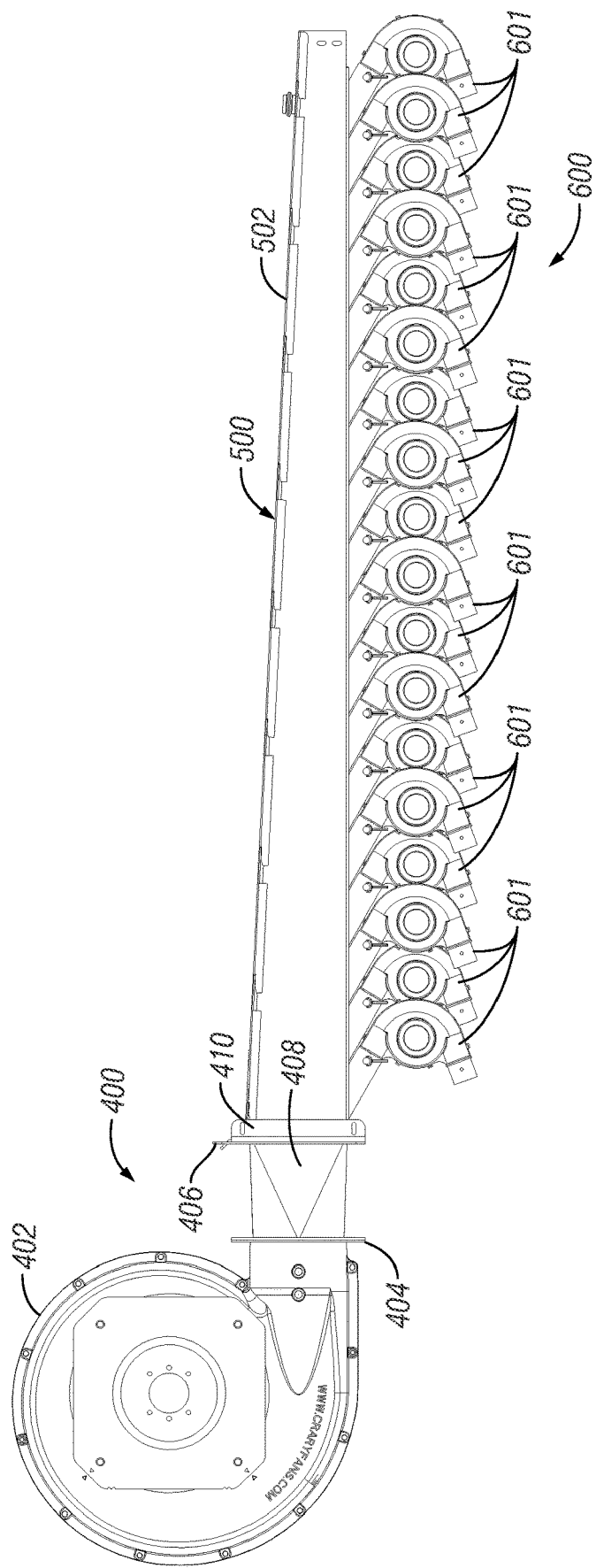
FIG. 15B is a side elevation view of an air production system, air handling system and particulate accelerator system in accordance with an illustrative embodiment.
Figure 23:
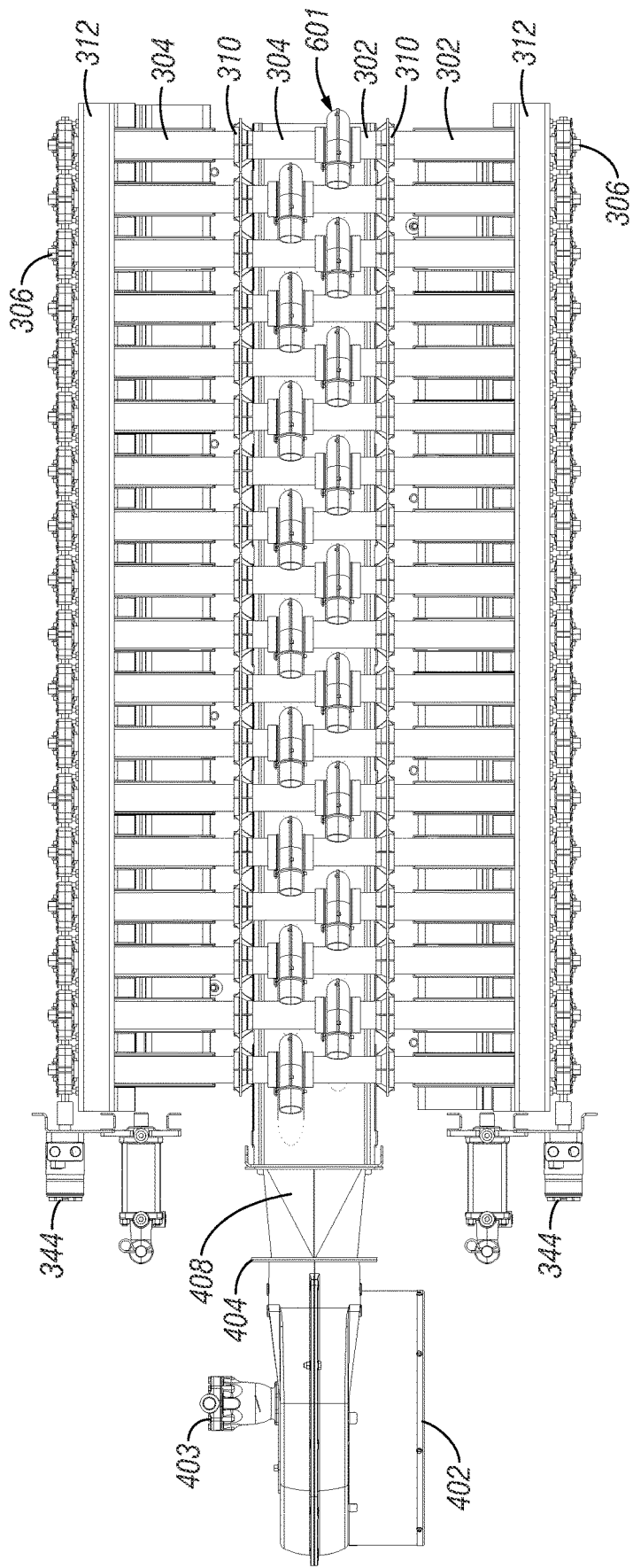
FIG. 23 is a bottom plan view of an air production system, an air handling system, a particulate accelerator system, and a partial particulate handling system in accordance with an illustrative embodiment.

In concurrent operation with the particulate delivery system 300 can be an air production system 400 and an air handling system 500. FIGS. 14, 15A and 15B illustrate a blower 402 of the air production system 400. The blower 402 is driven by a blower motor 403, as shown in FIG. 23. In an embodiment, a representative blower can operate at 20 horsepower (HP) and produce a volumetric flow rate of 120-150 cubic feet per minute (CFM) per row in operation. The disclosure also contemplates the blower 402 operating at variable RPM. In such instances, the blower 402 can require less horsepower than operating at a constant RPM. Operating the blower 402 at a constant RPM or variable RPM can be tailored to the specific demands of the particulate metering system 10 in a given application.

Figure 16:
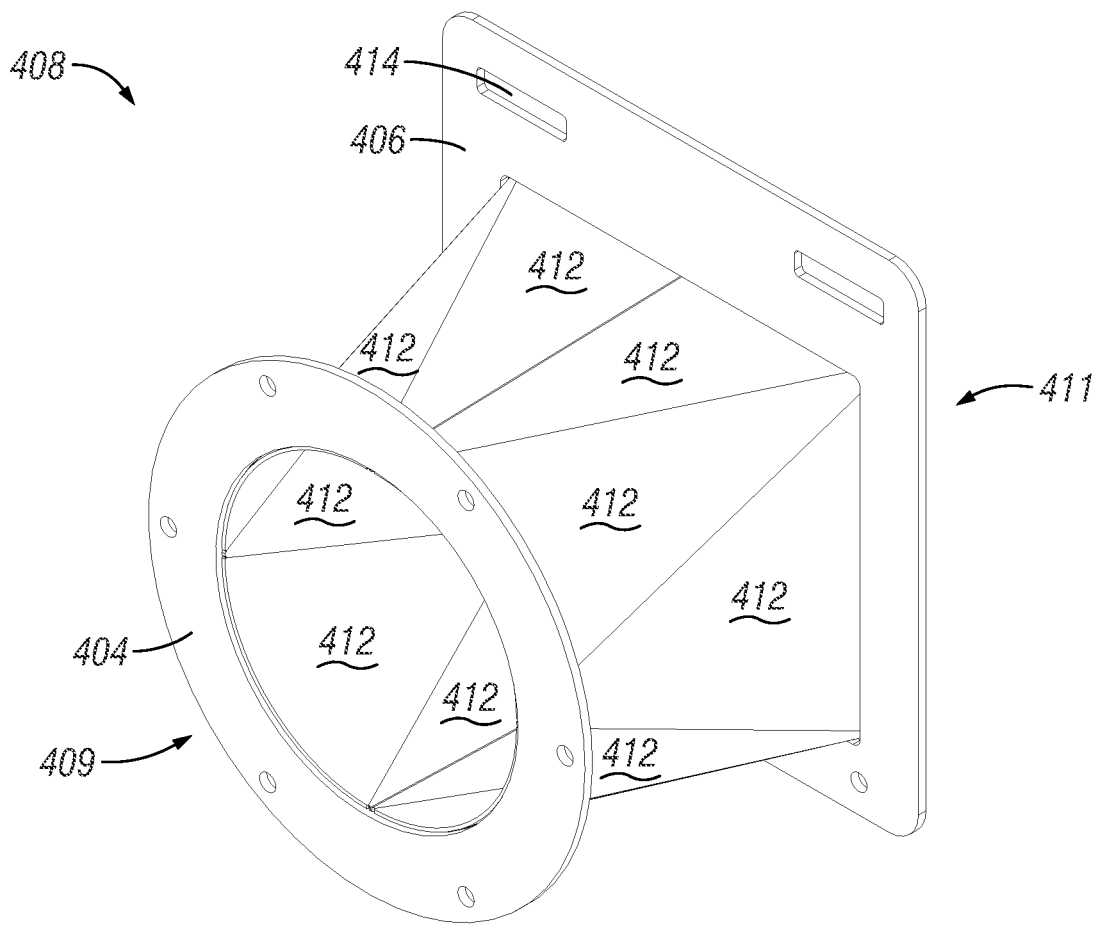
FIG. 16 is an isometric view of an expander in accordance with an illustrative embodiment.

Referring to FIG. 16, an inlet 409 side of an extension 408 can be connected to the blower 402 at an interface 404 to couple the blower 402 to the air handling system 500. The interface 404 between the blower 402 and the extender 404 can be flanges on an outlet of the blower 402 and an inlet of the extension 408 configured to be joined by nuts and bolts, or other means such as pinning, clamping, welding, and the like. The extension 408 can be comprised of a plurality of triangular-shaped surfaces 412 designed to impart desired flow properties as air enters the air handling system 500. The disclosure envisions alternative characteristics for the extension 408, including but not limited to, a circular cross-section, a nozzle, an expander, and the like. The extension 408 can be made of steel, but the disclosure contemplates other materials such as aluminum, polymers, composites, ceramics, and the like. An outlet 411 side of the extension 408 can have a plate 406 with slots 414. The plate 406 and slots 414 can connect to the coupler 410 of the air handling system 500, as shown illustratively in FIGS. 15A and 15B.

Figure 17:
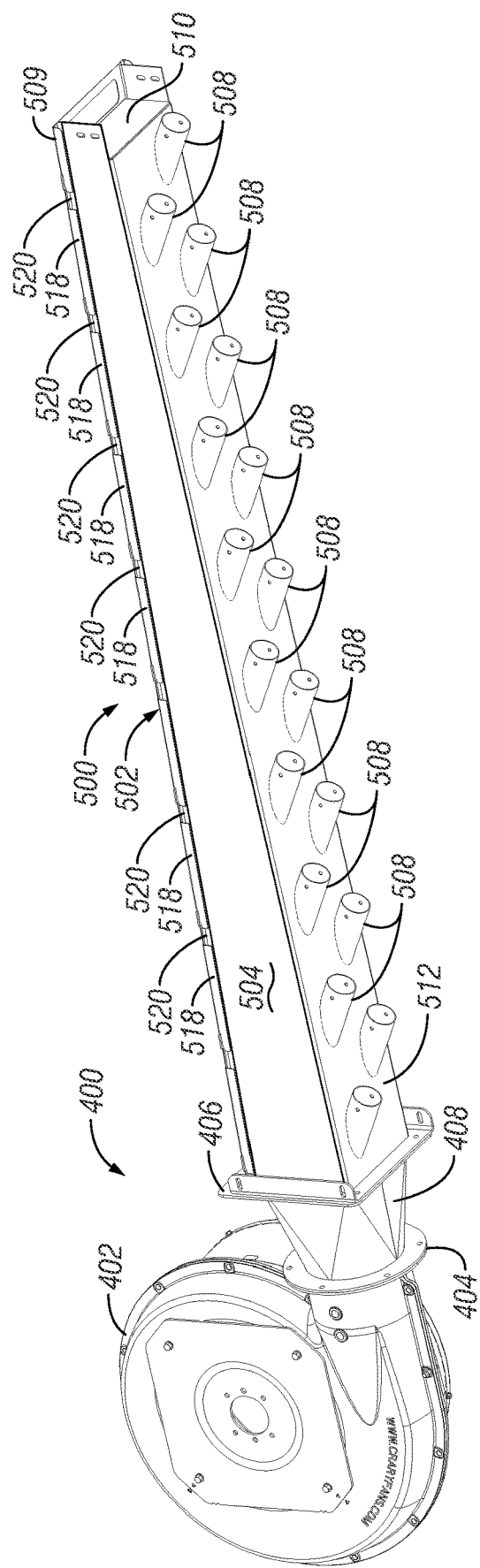
FIG. 17 is a bottom perspective view of an air production system and an air handling system in accordance with an illustrative embodiment.
Figure 18:
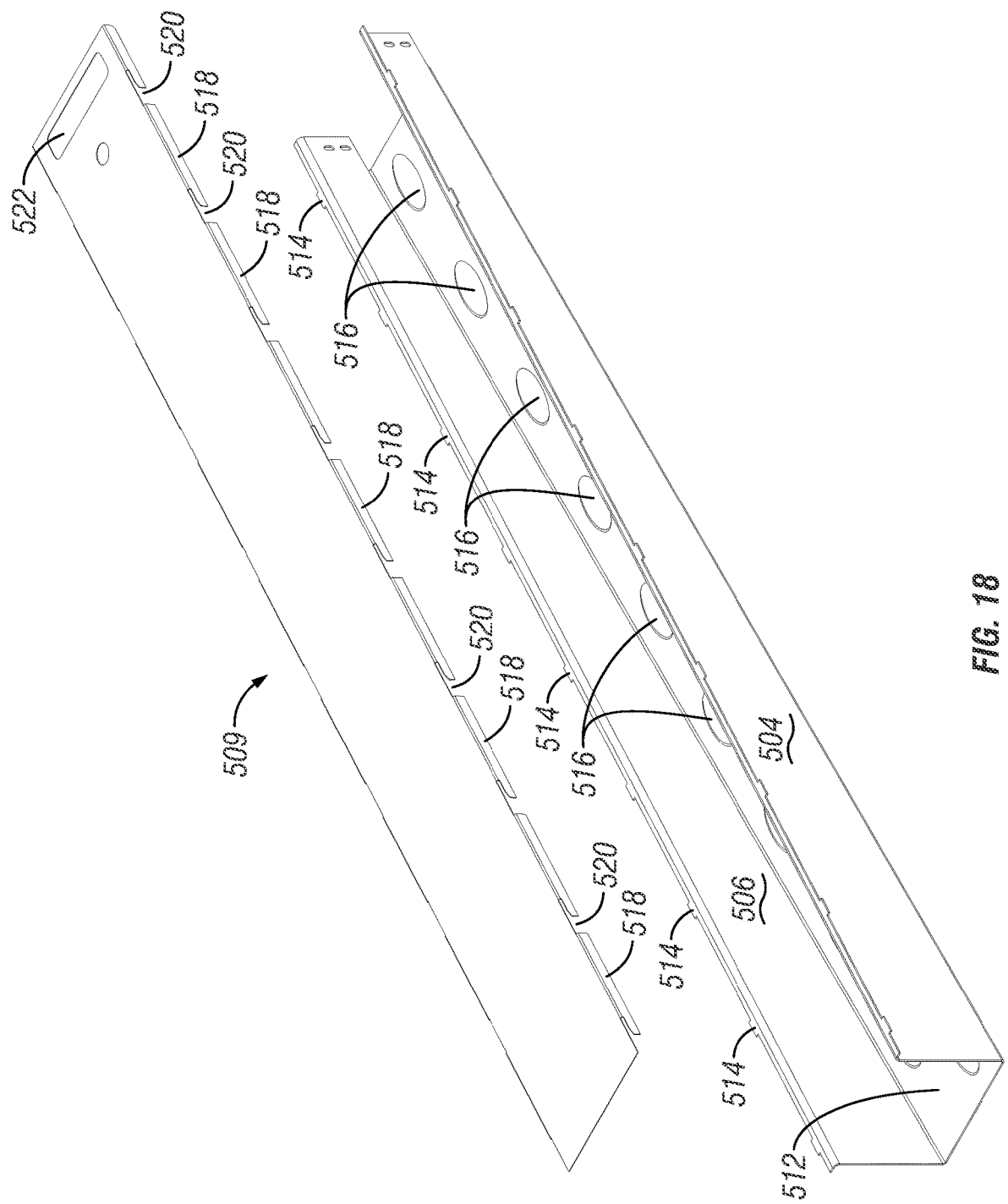
FIG. 18 is an exploded isometric view of a plenum and a plenum cover in accordance with an illustrative embodiment.

After exiting the extension 408, the air generated by blower 402 can enter a plenum 502 of the air handling system 500. Referring to FIGS. 15A and 15B, the air handling system 500 can be comprised of a plenum 502 and a plurality of outlet pipes 508. As shown in FIGS. 17 and 18, the plenum can contain a first side wall 504, second side wall 506, a bottom wall 512 and a distal wall 510. The second side wall 506 can be opposite the first side wall 504. The first side wall 504 and the second side wall 506 can contain a plurality of outwardly extending flanges 514. A cover 509 can be removably connected to the first side wall 504 and the second side wall 506. Referring to FIG. 18, the cover 509 can have flanges 518 extending inferiorly along the length of the cover 509. The flanges 518 can have a plurality of gaps 520 corresponding to the plurality of outwardly extending flanges 514 of the first side wall 504 and the second side wall 506. The plurality of gaps 520 can engage the plurality of outwardly extending flanges 514 to align the cover 509 on the plenum 502. An opening 522 in the cover 509 can allow a user to lock the cover into position on the plenum 502.

A plurality of apertures 516 can be disposed within the bottom wall 512 of the plenum 502. As shown in FIG. 18, the plurality of apertures 516 can be arranged in two rows along the length of the plenum 502. The two rows of apertures 516 along the length of the plenum 502 can be staggered longitudinally, as shown illustratively in FIGS. 15A, 15B and 17, to maximize compactness of the particulate accelerators 601 disposed below the plenum and/or to impart the desired airflow characteristics. The plurality of apertures 516 can be elliptical in shape. The disclosure, however, envisions other arrangements and/or shapes of the plurality of apertures without detracting from the objects of the disclosure. For example, the plurality of apertures 516 can be arranged in one row along the length of the plenum 502, or the plurality of apertures 516 can be rectangular in shape. The disclosure also contemplates the plurality of apertures disposed the first side wall 504, the second side wall 506, and/or the cover 509.

Referring to FIGS. 17 and 18, the first side wall 504 and the second side wall 506 can be trapezoidal in shape. In other words, at the edge proximate to the extension 408, the height of the first side wall 504 and the second side wall 506 is greater than the height of the same proximate to the distal wall 510. The tapering of the plenum 502 can maintain the appropriate pressure and airflow characteristics along its length as air exits the plenum 502 through the plurality of apertures 516.

A plurality of outlet pipes 508 can be connected to the bottom wall 512 of the plenum 502. Each of the plurality of outlet pipes 508 can be associated with each of the plurality of apertures 516. The outlet pipes 508 can be cylindrical in shape, but the disclosure envisions different shapes, including oval, ellipsoid, rectangular, square, and the like. The outlet pipes 508 can be secured to the bottom wall 512 by means commonly known in the art, including but not limited to, pinning, welding, fastening, clamping, and the like. The outlet pipes 508 can be oriented such that an acute angle exists between the major axis of the outlet pipes 508 and the bottom wall 512 of the plenum 502. The orientation of the outlet pipes 508 can impart the appropriate flow characteristics as air transitions from the plenum 502 to the particulate accelerator system 600. Based on the orientation of the cylindrical outlet pipes 508 relative to the plenum 502, the plurality of apertures 516 can be elliptical.

After passing through the plenum 502 and outlet pipes 508, air generated by the blower 402 can enter a particulate accelerator system 600. As shown in FIGS. 15A and 15B, each of the plurality of particulate accelerators 601 can connect to each of the plurality of outlet pipes 508.

Figure 19A:
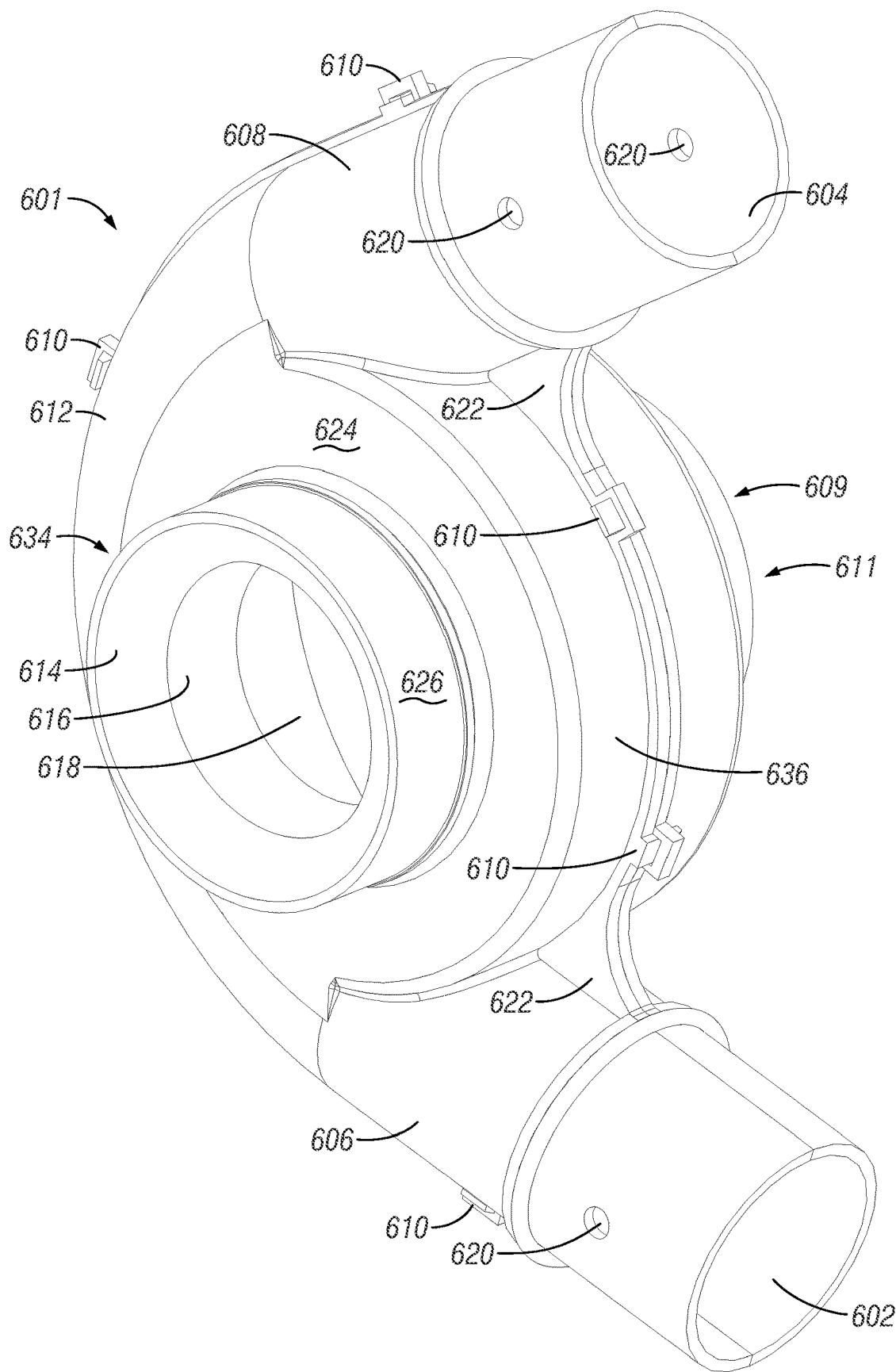
FIG. 19A is a front perspective of a particulate accelerator in accordance with an illustrative embodiment.
Figure 19B:
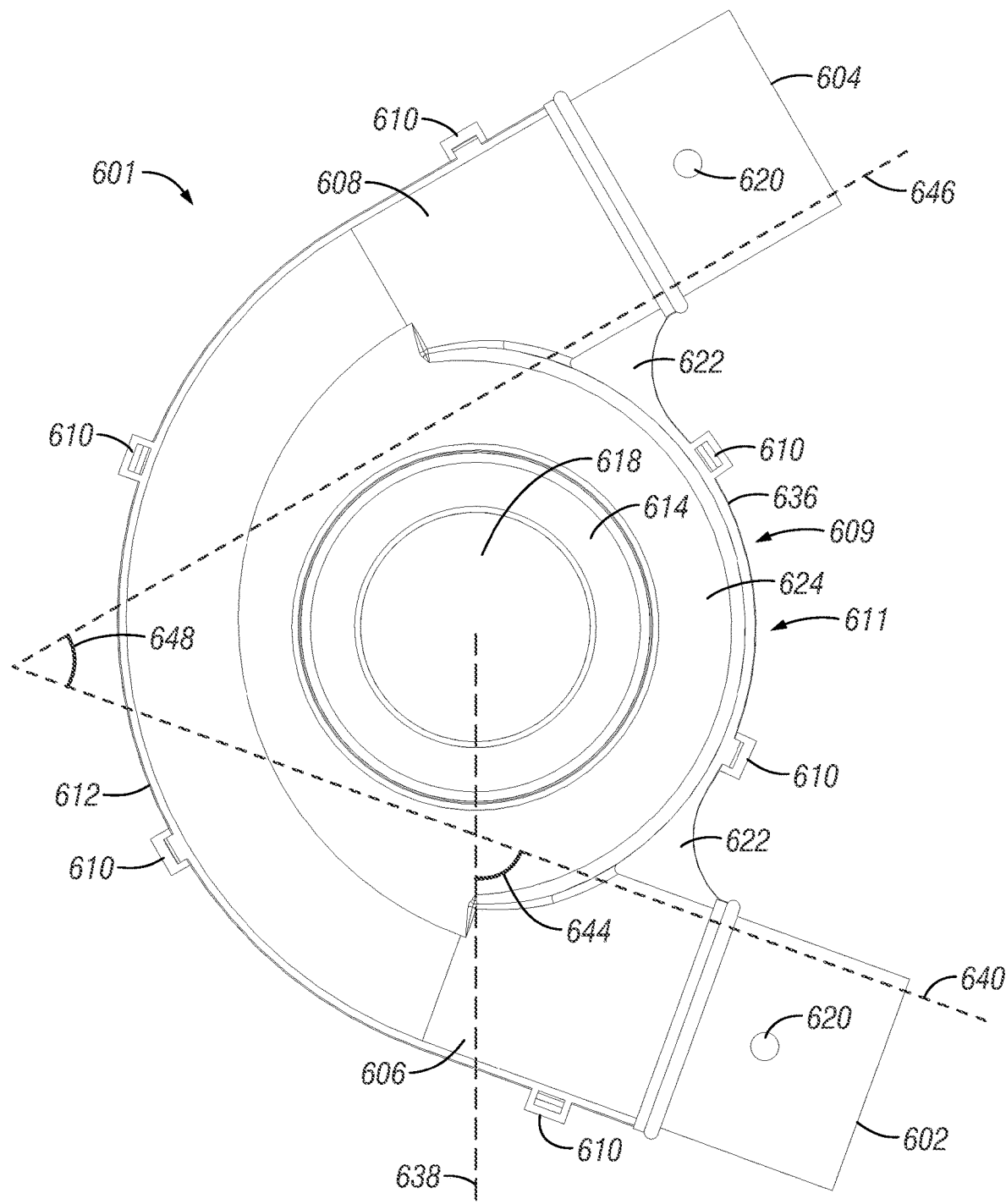
FIG. 19B is a side elevation view of a particulate accelerator in accordance with an illustrative embodiment.
Figure 20:
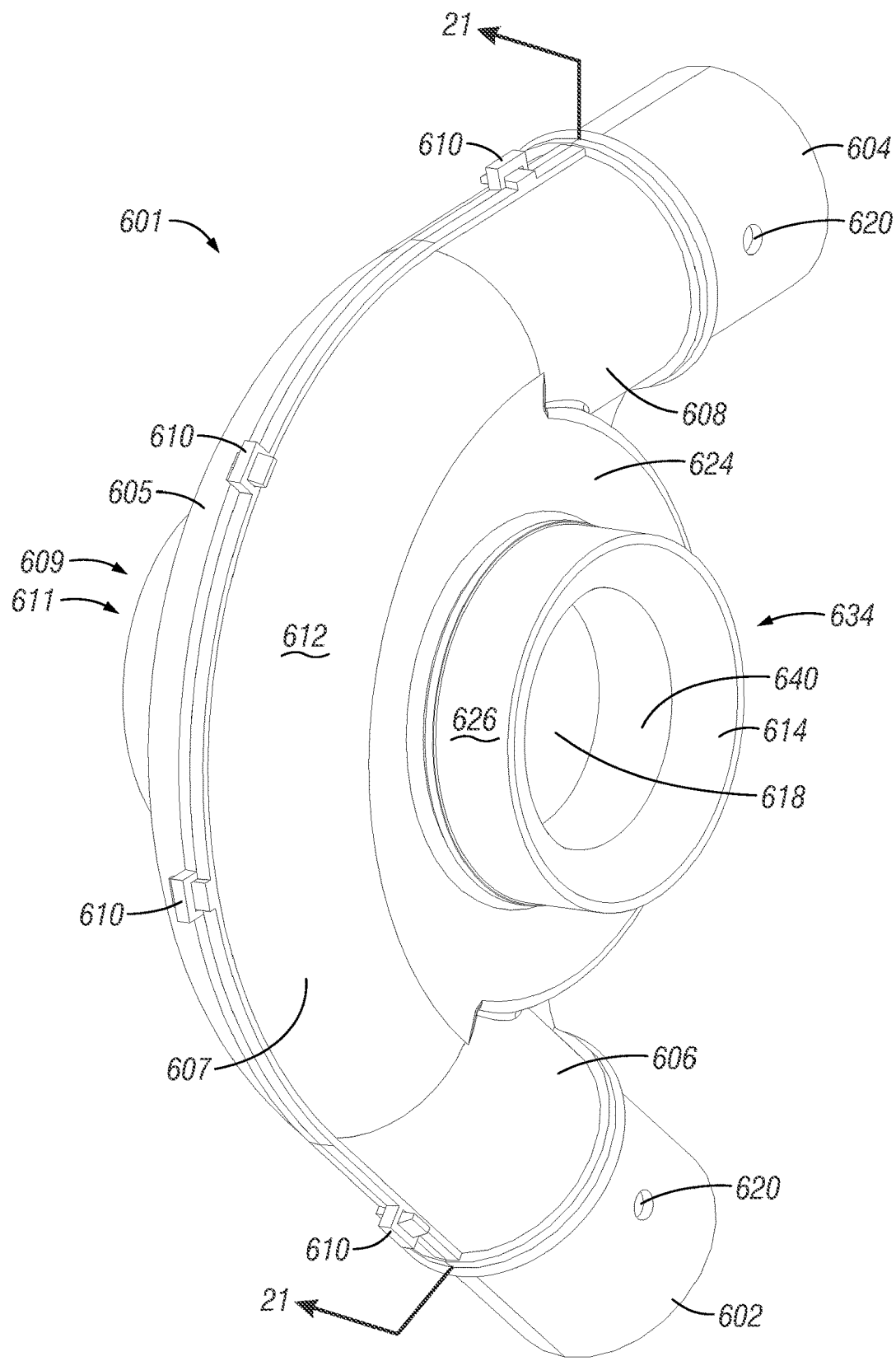
FIG. 20 is a rear perspective view of a particulate accelerator in accordance with an illustrative embodiment.
Figure 21:
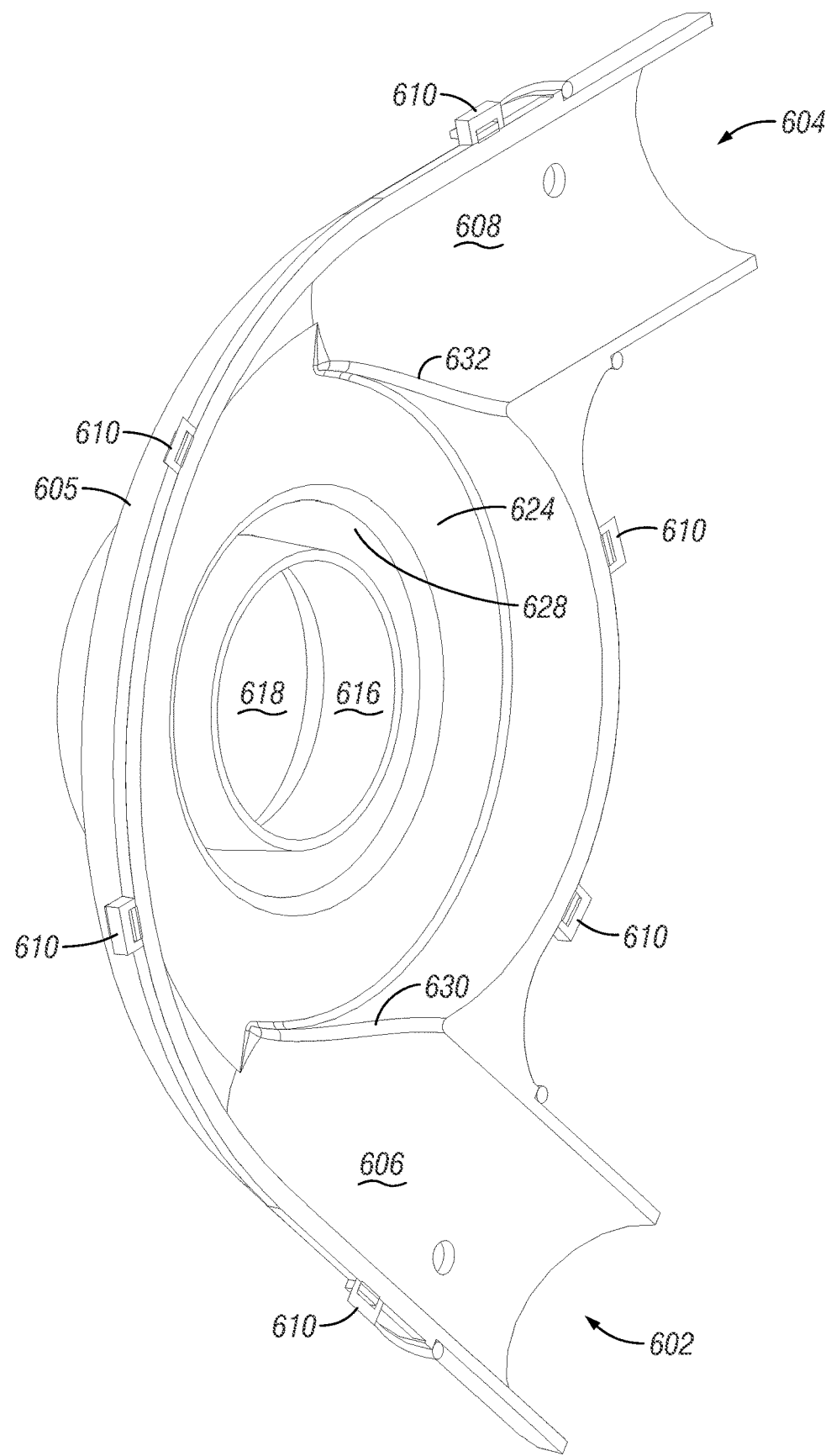
FIG. 21 is a cross-sectional view of the particulate accelerator of FIG. 20 taken along section line 21-21.

Referring to FIGS. 19A and 19B, each of the plurality of particulate accelerators 601 can have an inlet 604 and an outlet 602. The inlet 604 can connect to one of the plurality of outlet pipes 508 of the plenum 502 via holes 620. The connection can be through a screw or any other means so as not to significant impede the airflow through the outlet pipe 508 and/or the inlet 604. In an embodiment, a locking pin (not shown) engages the holes 620 and can provide for quick installation and/or removal of a particulate accelerator 601 on the plenum 502, thereby increasing the modularity of the system.

A housing 609 can be connected to the inlet 604 and/or the outlet 602. The housing 609 can be comprised of two halves 605 and 607 that are secured together through a plurality of clasps 610, as shown in FIG. 20. The housing 609, however, can be composed of a single structure. The particulate accelerator 601 can be made of steel, but the disclosure contemplates other materials such as aluminum, polymers, composites, ceramics, and the like. An inlet tube 608 and/or an outlet tube 606 can extend from the housing 609. The housing 609 can be integrally formed to the inlet tube 608 and/or the outlet tube 606. A plurality of triangular members 622 can provide support for the inlet tube 608 and/or the outlet tube 606, as shown in FIG. 19B.

The main body 611 of the housing 609 can be generally cylindrical in shape. The main body 611 can have curved back wall 612 comprising an arc from the inlet tube 608 to the outlet tube 606. Adjacent to the curved back wall 612 can be opposing side walls 624. The opposing side walls 624 can be parallel to one another and generally parallel to the direction of airflow through the particulate accelerator 601. Referring to FIG. 19, a cylindrical flange 634 can extend outwardly and perpendicularly from each of the opposing side walls 624. A cylindrical flange 634 can have an outer surface 626, an inner surface 616, and a sloped surface 614. A cylindrical flange 634 can have a center opening 618. The sloped surface 614 can guide one of the long auger tube-particulate accelerator interface edges 340 of the plurality of long auger tubes 304 to connect with the inner surface 616. Within a cylindrical flange 634 disposed on the opposing side wall 624, a sloped surface 614 can guide one of the short auger tube-particulate accelerator interface edges 342 of the plurality of short auger tubes 302 to connect with an inner surface 616.

As mentioned above, the gasket 341 (FIG. 13) can provide a seal between the plurality of short and long auger tubes 302 and 304 and the inner surfaces 616 of the particulate accelerators 601. The gasket 341 can maintain the seal while permitting flexing of the short auger tube 304 and long auger tube 302 within the particulate accelerator 601 due to movement of the system as the particulate containers 202 and 203 are emptied, experience vibration, and the like. The distal portions of the long auger tubes 302 and the short auger tubes 304 can create an interference fit with the gaskets 341. The auger tubes 302 and 304 can be connected to the cylindrical flanges 634 through other means commonly known in the art, including but not limited to, pinning, clamping, fastening, adhesion, and the like. The outward projections of the cylindrical flanges 634 can result in gaps 628 within the opposing side walls 624, as shown in FIG. 21.

The auger 332 can transmit the particulate contained within the long auger tube 302 towards the long auger tube-particulate accelerator interface edge 340, as shown in FIGS. 12B and 13. Another auger 332 can also transmit the particulate contained within the short auger tube 304 towards the short auger tube-particulate accelerator interface edge 342. Referring now to FIG. 21, particulate from the long auger tube 302 can enter the particulate accelerator 601 through the center opening 618. The same process involving the short auger tube 304 can occur on the opposing side wall 624 of the particulate accelerator 601. Upon reaching the interface edges 340 and 342 of the center openings 618, the particulate mixture can descend vertically within the main body 611 due to the force of gravity.

Referring to FIGS. 19A, 19B and 21, air can enter a particulate accelerator 601 through the inlet 604, inlet tube 608, and inlet transition zone 632. The inlet transition zone 632 can be characterized as the point at which air enters the main body 611 from the inlet tube 608. Due to the shape of the particulate accelerator 601, particularly the angle 648 between the inlet tube 608 and the outlet tube 606, the air can track in a flow pattern around the curved back wall 612 towards an outlet transition zone 630. In an embodiment, the angle 648 between a line 646 parallel to the major axis of the inlet tube 608 and a line 640 parallel to the major axis of the outlet tube 606 can be acute, as shown in FIG. 19B. In another embodiment, the angle 648 between the line 646 of the inlet tube 608 and the line 640 of the outlet tube 606 can be between thirty and sixty degrees. The disclosure also contemplates that angles 648 can be at a right angle or obtuse angle based on the desire flow characteristics through the particulate accelerator 601.

While air is tracking in a flow pattern around the curved back wall 612 towards an outlet transition zone 630, the air can mix with the particulate descending vertically in the particulate accelerator 601 and can force at least a portion of the particulate mixture through the outlet 602. Any portion of the particulate mixture and air not ejected through the outlet transition zone 630 can track in a flow along the curved front wall 636 of the main body 611, after which the particulate mixture and air can rejoin subsequent airflow from the inlet 604 proximate to the inlet transition zone 632.

Referring to FIG. 19B, an acute angle 644 can exist between the major axis 640 of the outlet tube 606 and a vertical axis 638 bisecting the center opening 618 of the cylindrical flange 634. The acute angle 644 can result in a greater distance for the particulate to descend vertically prior to contacting a bottom portion of the curved back wall 612. The greater distance can provide for increased time for the air, which can be tracking in a flow pattern around the curved back wall 612, to impart horizontal force on the particulate mixture while in the outlet transition zone 630. Due to the shape of the particulate accelerator 601, the configuration can create a fluid bed to suspend the particulate as the particulate exits the outlet 602 and into a discharge tube (not shown). The fluid bed and particulate suspension can reduce the effects of wall friction between the particulate and the discharge tube. In particular, the fluid bed and particulate suspension can counteract the gravitational force on particulate traveling in a generally horizontal tube and can minimize interaction between the particulate and the bottom portion of a tube. The configuration can minimize increased backpressure due to wall friction and/or partial clogging. The fluid bed and particulate suspension can further eliminate complete clogging, resulting in improved particular discharge and overall efficiency of the metering system.

After the particulate mixture exits particulate accelerator 601 via air exit outlet 602, the particulate mixture can enter a tube (not shown) connected to the outlet 602 via holes 620. Then, the particulate mixture can be metered to a field in any manner commonly known in the art.

Figure 22:
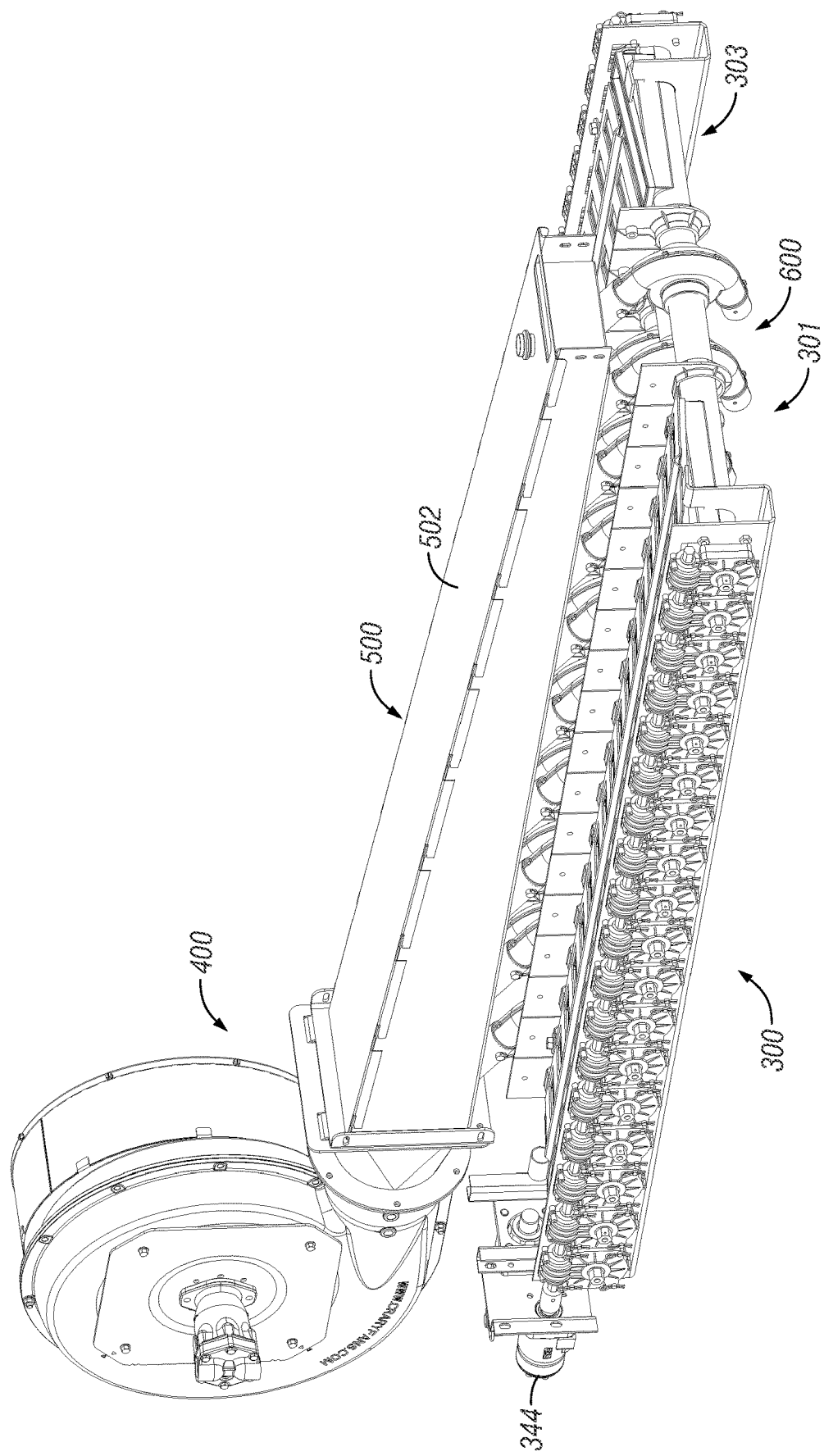
FIG. 22 is a front perspective view of an air production system, an air handling system, a particulate accelerator system, and a particulate handling system in accordance with an illustrative embodiment.

Referring to FIGS. 22 and 23, the process described above can simultaneously occur in each particulate accelerator 601 disposed along the length of the plenum 502. As shown in FIG. 22, for example, the particulate handling system 300 can include eighteen short auger tubes 302 opposite eighteen long auger tubes 304. The disclosure, however, contemplates that any number of particulate handling subsystems 301 and 303 can be provided. In an exemplary example, the particulate handling system 300 can include thirty-six short auger tubes 302 opposite thirty-six long auger tubes 304, each row operated independently. In another exemplary example, the particulate handling system 300 can be scaled down to less than eighteen pairs of particulate handling subsystems 301 and 303 based on the needs of the application.

In the illustrated embodiment of FIG. 22, each of the eighteen pairs of auger tubes 302 and 304 can be separated by a particulate accelerator 600 and connected to the air handling system 500 and the air production system 400. A first row of particulate handling subsystems 301 can receive a first type of particulate from first particulate container 202. A second row of particulate handling subsystems 303 can receive a second type of particulate from second particulate container 203. In an embodiment that uses a plurality of auger motors 344 connected to a plurality of augers 332, the configuration can permit control of the ratio of first type of particulate to second types of particulate for some or all of the eighteen pairs of particulate handling subsystems 301 and 303. In an exemplary embodiment of the dual particulate accelerator system 700 discussed below, the configuration can permit control of the ratio of four or more types of particulate for each of the eighteen pairs of particulate handling subsystems 301 and 303.

As discussed above, a plurality of moveable and/or controllable gate covers (not shown) can be installed on the plurality of gates 308. The gate covers, when closed, can prevent particulate from filling the short auger tubes 304 and/or long auger tubes 302. The configuration can further increase the modularity of the metering system 10 by limiting which rows on a field, if any, receive one or more of the types of particulate. The gate covers can be manually and/or automatically opened and closed.

Figure 24:
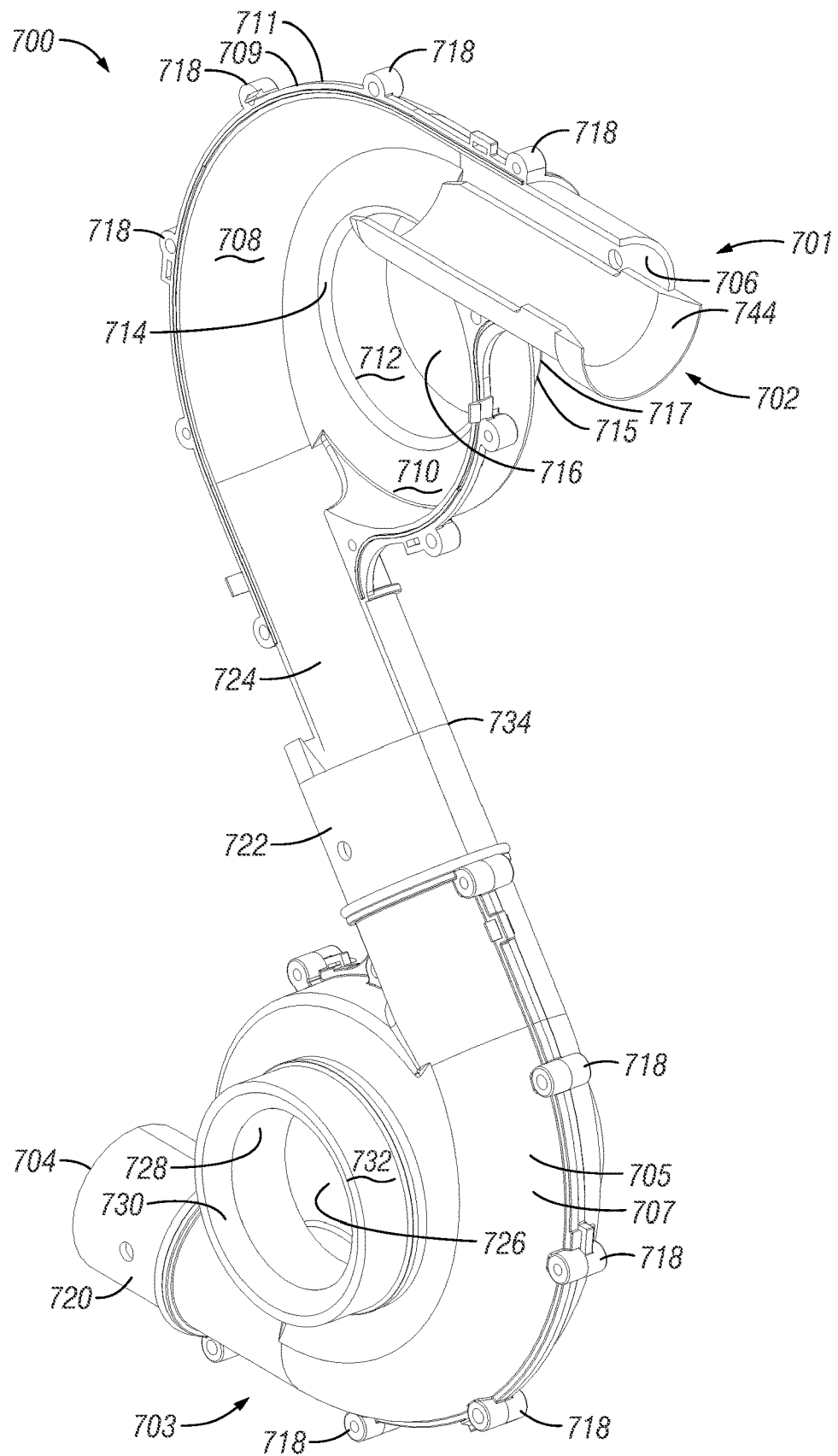
FIG. 24 is a isometric view of a portion of a dual particulate accelerator system in accordance with an illustrative embodiment.
Figure 25:
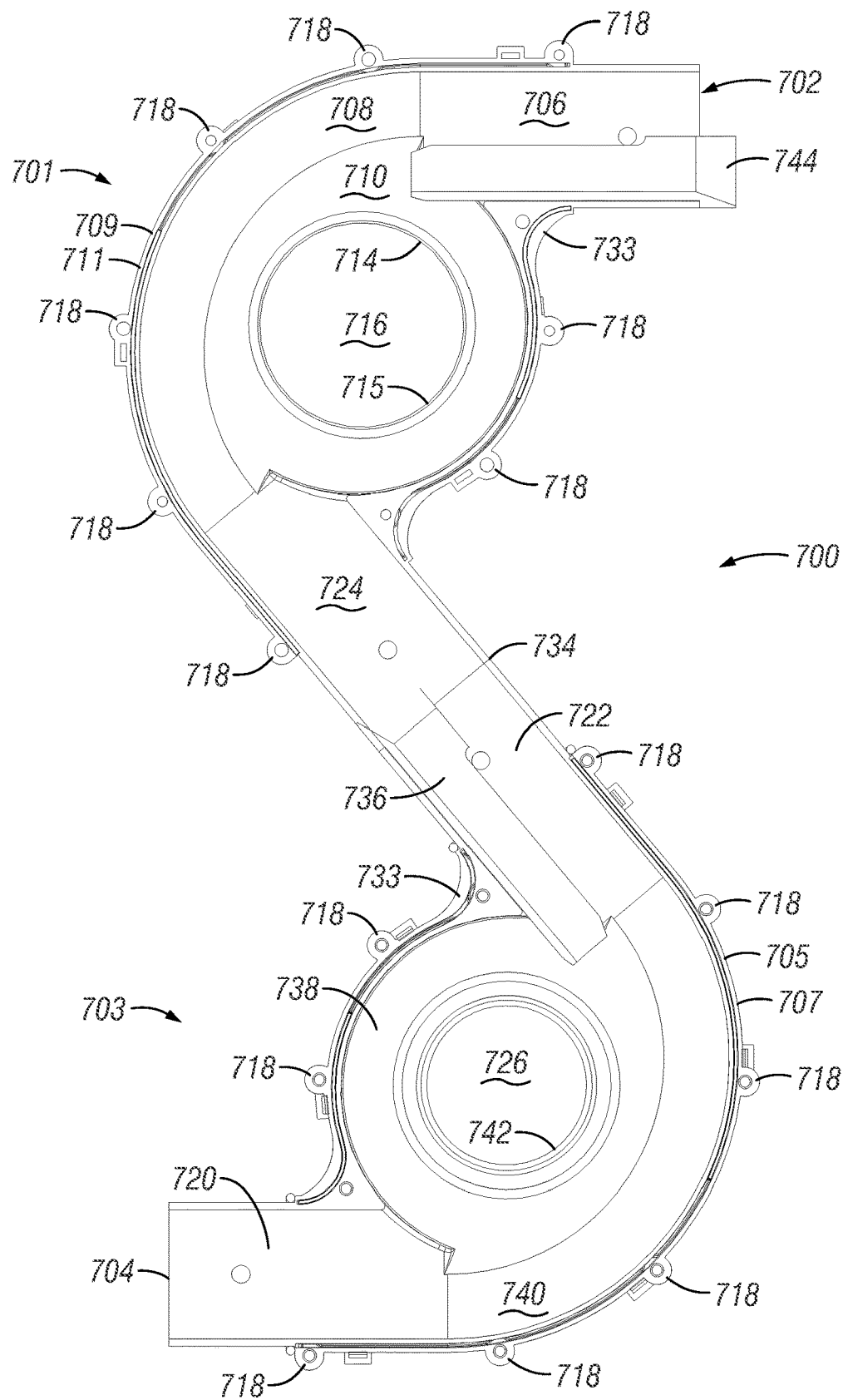
FIG. 25 is a side elevation view of a portion of a dual particulate accelerator system in accordance with an illustrative embodiment.

Referring to FIGS. 24 and 25, a dual particulate accelerator system 700 is provided. The dual particulate accelerator system 700 can include a first particulate accelerator 701 and a second particulate accelerator 703. The first particulate accelerator housing 709 can be connected to the inlet tube 706 and/or the outlet tube 724 of the first particulate accelerator 701. A baffle 744 can be disposed within the inlet tube 706 of the first particulate accelerator 701. The baffle 744 can extend from outside the inlet tube 706 and into the first particulate accelerator housing 709. The baffle 744 can restrict the flow of air through inlet tube 706 to impart the desired airflow characteristics in the first particulate accelerator 701. The baffle 744 can be placed in the inlet tube 706 of the first accelerator 701, or at any point within the flow of air to impart the desired airflow characteristics. The baffle 744 can be self-regulating, adjustable and/or controlled by any means commonly known in the art, including but not limited to, mechanical, electrical, electronic, pneumatic, and hydraulic controls.

The first particulate accelerator 701 can include an inlet 702, an inlet tube 706, and an outlet tube 724. The first particulate accelerator housing 709 can be integrally formed to the inlet tube 706 and/or the outlet tube 724 of the first particulate accelerator 701. The first particulate accelerator housing 709 can be comprised of two halves are secured together through a plurality of clasps and/or engaged holes 718, as shown in FIG. 24. The housing 709, however, can be composed of a single structure. The first particulate accelerator 701 can be made of steel, but the disclosure contemplates other materials such as aluminum, polymers, composites, ceramics, and the like. A plurality of triangular members 733 can provide support for the inlet tube 706 and/or the outlet tube 724 of the first particulate accelerator 701, as shown in FIG. 25.

A first main body 711 of the first particulate accelerator housing 709 can be generally cylindrical in shape. The first main body 711 can have first curved back wall 708 comprising an arc from the inlet tube 706 to the outlet tube 724 of the first particulate accelerator 701. Adjacent to the first curved back wall 708 can be opposing side walls 710. The opposing side walls 710 can be parallel to one another and generally parallel to the direction of airflow through the first particulate accelerator 701. Referring to FIG. 24, a cylindrical flange 715 can extend outwardly and perpendicularly from each of the opposing side walls 710. The cylindrical flange 715 can have an outer surface, an inner surface 712, and a sloped surface 717. The cylindrical flange 715 can have a center opening 716. The sloped surface 717 can guide the long auger tube-particulate accelerator interface edges 340 of the plurality of long auger tubes 304 to connect with the inner surface 712. Within a cylindrical flange 715 disposed on the opposing side wall 710, a sloped surface 717 can guide the short auger tube-particulate accelerator interface edges 342 of the plurality of short auger tubes 302 to connect with the inner surface 712. A gasket can provide a seal between the plurality of short and long auger tubes 302 and 304 and the inner surfaces 712 of the first particulate accelerator 701. The gasket can maintain the seal while permitting flexing of the short auger tube 304 and long auger tube 302 within the first particulate accelerator 701 due to movement of the system as the particulate containers 202 and 204 are emptied, experience vibration, and the like. The distal portions of the long auger tubes 302 and the short auger tubes 304 can create an interference fit with the gaskets. The auger tubes 302 and 304 can be connected to the cylindrical flanges 717 through other means commonly known in the art, including but not limited to, pinning, clamping, fastenings, adhesion, and the like. The outward projections of the cylindrical flanges 715 can result in gaps 714 within the opposing side walls 710, as shown in FIG. 25.

Likewise, the second particulate accelerator 703 can include an inlet tube 722, an outlet tube 720, and an outlet 704. The inlet tube 722 of the second particulate accelerator 703 can be connected to the outlet tube 724 of the first particulate accelerator 701 at junction 734.

A second particulate accelerator housing 705 can be connected to the inlet tube 722 and/or the outlet tube 720 of the second particulate accelerator 703. The baffle 736 can extend from the outlet tube 724 of the first particulate accelerator 701, though junction 734, and into the second particulate accelerator housing 705. The baffle 736 can restrict the flow of air through inlet tube 722 to impart the desired airflow characteristics in the second particulate accelerator 703. The baffle 736 can be placed in the inlet tube 722 of the second accelerator 703, or at any point within the flow of air to impart the desired airflow characteristics. The baffle 736 can be self-regulating, adjustable and/or controlled by any means commonly known in the art, including but not limited to, mechanical, electrical, electronic, pneumatic, and hydraulic controls. The baffle 744 can also be similarly disposed on particulate accelerator 601 consistent with the objects of the disclosure.

The second particulate accelerator housing 705 can be integrally formed to the inlet tube 722 and/or the outlet tube 720 of the second particulate accelerator 703. The second particulate accelerator housing 705 can be comprised of two halves are secured together through a plurality of clasps and/or engaged holes 718, as shown in FIG. 24. The housing 705, however, can be composed of a single structure. The second particulate accelerator 703 can be made of steel, but the disclosure contemplates other materials such as aluminum, polymers, composites, ceramics, and the like. A plurality of triangular members 733 can provide support for the inlet tube 722 and/or the outlet tube 720 of the second particulate accelerator 703, as shown in FIG. 25.

A second main body 707 of the second particulate accelerator housing 705 can be generally cylindrical in shape. The second main body 707 can have second curved back wall 740 comprising an arc from the inlet tube 722 to the outlet tube 720 of the second particulate accelerator 703. Adjacent to the curved back wall 740 can be opposing side walls 738. The opposing side walls 738 can be parallel to one another and generally parallel to the direction of airflow through the first particulate accelerator 703. Referring to FIG. 24, a cylindrical flange 732 can extend outwardly and perpendicularly from the opposing side walls 738. The cylindrical flange 732 can have an outer surface, an inner surface 738, and a sloped surface 730. The cylindrical flange 732 can have a center opening 726. The sloped surface 730 can guide the long auger tube-particulate accelerator interface edges 340 of the plurality of long auger tubes 304 to connect the inner surface 738. Within a cylindrical flange 732 disposed on the opposing side wall 738, a sloped surface 730 can guide the short auger tube-particulate accelerator interface edges 342 of the plurality of short auger tubes 302 to connect with the inner surface 738. A gasket can provide a seal between the plurality of short and long auger tubes 302 and 304 and the inner surfaces 728 of the second particulate accelerator 703. The gasket can maintain the seal while permitting flexing of the short auger tube 304 and long auger tube 302 within the second particulate accelerator 703 due to movement of the system as the particulate containers 202 and 204 are emptied, experience vibration, and the like. The distal portions of the long auger tubes 302 and the short auger tubes 304 can create an interference fit with the gaskets. The auger tubes 302 and 304 can be connected to the cylindrical flanges 732 through other means commonly known in the art, including but not limited to, pinning, clamping, fastening, adhesion, and the like. The outward projections of the cylindrical flanges 732 can result in gaps 742 within the opposing side walls 740, as shown in FIG. 25.

Figure 12A:
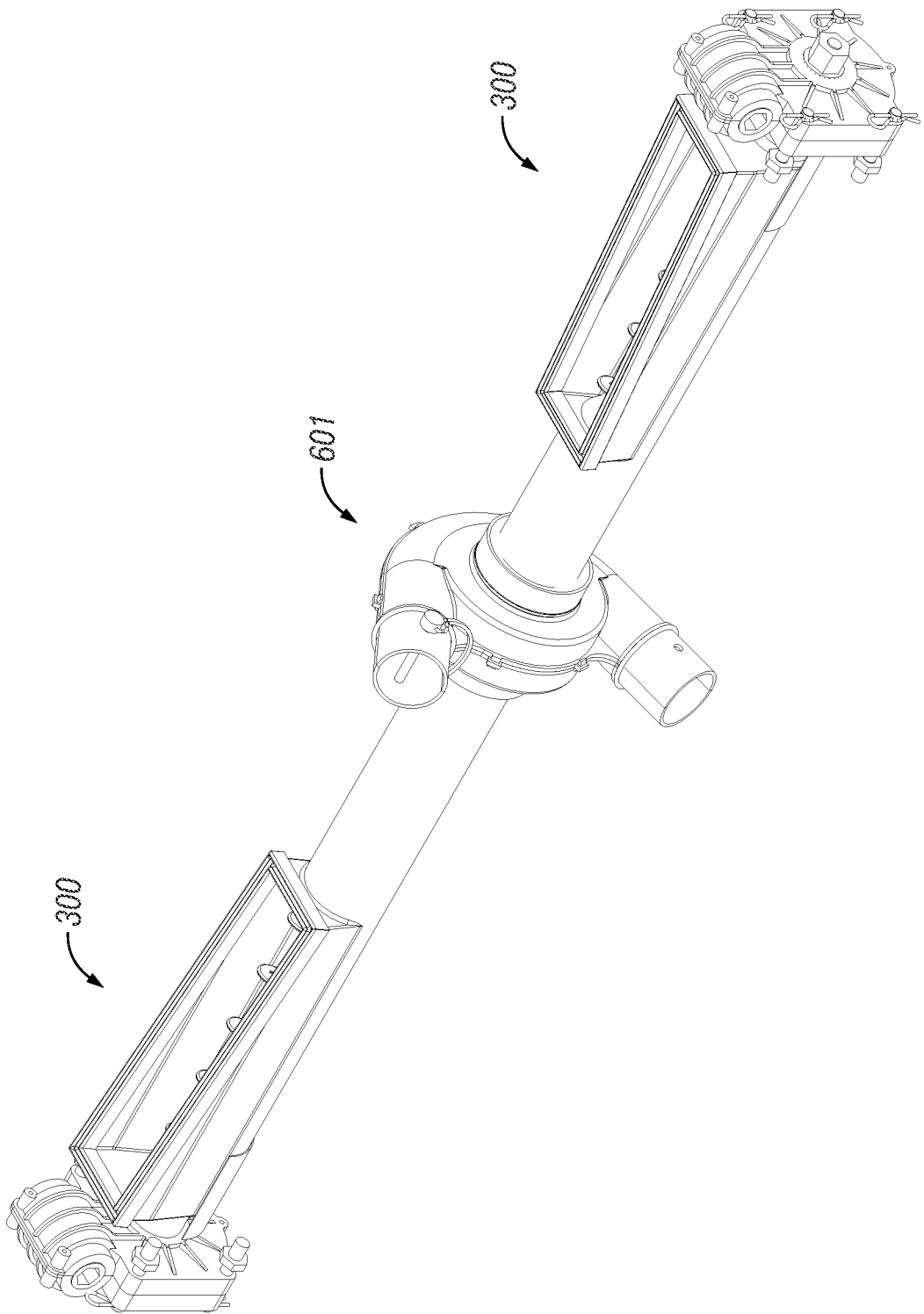
FIG. 12A is a front perspective view of a particulate accelerator and particulate handling systems in accordance with an illustrative embodiment.
Figure 12B:
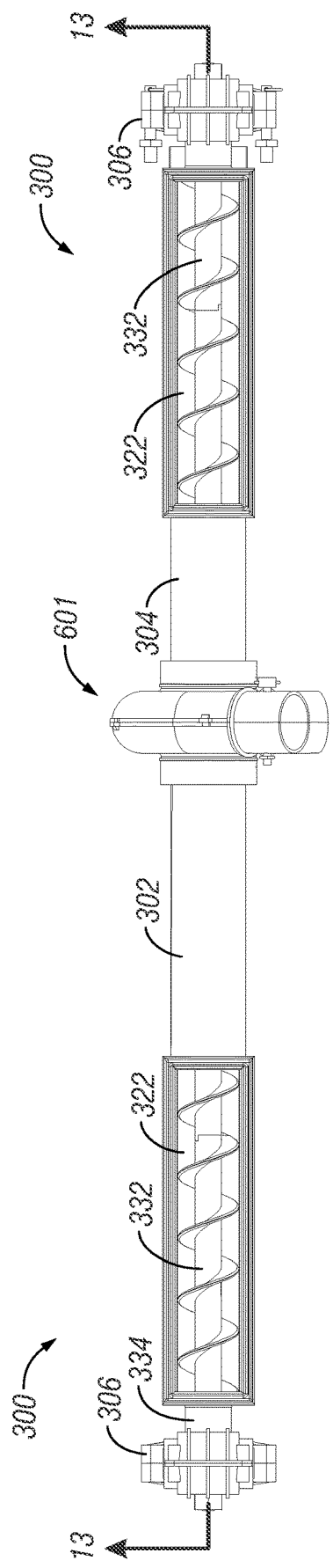
FIG. 12B is a top plan view of a particulate accelerator and particulate handling systems in accordance with an illustrative embodiment.

An auger 332 can transmit the particulate contained within a long auger tube 302 towards a long auger tube-particulate accelerator interface edge 340, as shown in FIGS. 12B and 13. Another auger 332 can also transmit the particulate contained within a short auger tube 304 towards a short auger tube-particulate accelerator interface edge 342. Referring now to FIG. 24, particulate from the long auger tube 302 can enter the first particulate accelerator 701 through the center opening 716. The same process involving the short auger tube 304 can occur on the opposing side wall 738 of the second particulate accelerator 703. Upon reaching interface edges 340 and 342 of center opening 716, the particulate mixture, consisting of a controlled ratio of a plurality of particulates, can descend vertically within the first main body 711 due to the force of gravity.

The same process can occur in the second particulate accelerator 703. An auger 332 can transmit the particulate contained within a long auger tube towards a long auger tube-particulate accelerator interface edge 340, as shown in FIGS. 12B and 13. Another auger 332 can also transmit the particulate contained within a short auger tube 304 towards a short auger tube-particulate accelerator interface edge 342. The particulate from the long auger tube 302 can enter the second particulate accelerator 703 through the center opening 726. The same process involving the short auger tube 304 can occur on the opposite side wall 710 of the second particulate accelerator 703. Upon reaching the interface edges 340 and 342 of the center opening 726, the particulate mixture, consisting of a controlled ratio of a plurality of particulates, can descend vertically within the second main body 707 due to the force of gravity.

Referring to FIGS. 24 and 25, air can enter the first particulate accelerator 701 through the inlet 702 and the inlet tube 706. Due to the shape of the first particulate accelerator 701, air can track in a flow pattern around the curved back wall 708 towards the outlet tube 724. In the process, air can mix with the particulate mixture descending vertically in the first particulate accelerator 701 and can force a portion of the particulate mixture through outlet tube 724. Any portion of the particulate mixture and air not ejected through the outlet tube 724 of the first particulate accelerator 701 can track in a flow along a curved front wall of main body 711, after which the particulate mixture and air can rejoin subsequent airflow from the inlet 702.

The air-particulate mixture exiting the first particulate accelerator 701 can enter the inlet tube 722 of the second particulate accelerator 703. The air-particulate mixture can track in a flow pattern around the curved back wall 740 towards the outlet tube 720 and outlet 704. In the process, the air-particulate mixture can further mix with a second particulate mixture descending vertically in the second particulate accelerator 703 and can force a portion of the particulate mixture through outlet tube 720. Any portion of the particulate mixture and air not ejected through the outlet tube 720 of the second particulate accelerator 703 can track in a flow along a curved front wall of main body 707, after which the particulate mixture and air can rejoin subsequent air-particulate mixture from the inlet tube 722 of the second particulate accelerator 703.

The air-particulate mixture exiting outlet 704 can include a blend of particulates mixed in the first particulate accelerator 701 and a blend of particulates mixed in the second particulate accelerator 703. In one embodiment, the process can permit fine control of four types of particulate without sacrificing loss of airflow efficiency. After the particulate mixture and air can enter a tube (not shown) connected to the outlet 704, the particulate mixture can be metered to a field in any manner commonly known in the art. The process described above can simultaneously occur in each dual particulate accelerator system 700 disposed along the length of the plenum 502. As shown in FIG. 22, for example, the particulate handling system 300 can include eighteen short auger tubes 304 opposite eighteen long auger tubes 302. Each of the eighteen pairs of auger tubes 302 and 304 can be separated by a dual particulate accelerator system 700 and connected to the air handling system 500 and the air production system 400.

The disclosure is not to be limited to the particular embodiments described herein. In particular, the disclosure contemplates numerous variations in the type of ways in which embodiments of the disclosure can be applied to metering systems with variable blend and variable application rate controls for particulate matter. The foregoing description has been presented for purposes of illustration and description. It is not intended to be an exhaustive list or limit any of the disclosure to the precise forms disclosed. It is contemplated that other alternatives or exemplary aspects that are considered included in the disclosure. The description is merely examples of embodiments, processes or methods of the disclosure. It is understood that any other modifications, substitutions, and/or additions can be made, which are within the intended spirit and scope of the disclosure. For the foregoing, it can be seen that the disclosure accomplishes at least all of the intended objectives.

The previous detailed description is of a small number of embodiments for implementing the disclosure and is not intended to be limiting in scope. The following claims set forth a number of the embodiments of the disclosure disclosed with greater particularity.

What is claimed is:

1. A particulate metering system, comprising:

a particulate bin for housing a particulate;

a flow path with:

a. an inlet in communication with an intake configured to receive pressurized air for suspending particulate in air for agriculture applications;

b. an outlet in communication with a discharge configured to dispense particulate suspended in air for agriculture applications;

a fan having an air output providing pressurized air into an air input of the flow path;

a particulate input in communication with the flow path, the particulate input having an origin at the particulate bin;

a mixing area within the flow path comprising a confluence of the air input and two or more of the particulate input, wherein the mixing area comprises opposing particulate input spaced apart by the air input; and one or more metering control in operable communication with the air input and the particulate input for controlling a blend of the two or more of the particulate input and the air input at the confluence.

2. The particulate system of claim 1, further comprising:

a plurality of the particulate input, wherein each of the plurality of the particulate input have a separate origin at the particulate bin.

3. The particulate system of claim 1, further comprising:

a plurality of the flow path and a plurality of gas-particulate outputs at the discharge, the plurality of gas-particulate outputs in communication with the air input and wherein the air input has a metered proportion across the plurality of gas-particulate outputs.

4. The particulate system of claim 1, further comprising:

a first particulate input having a first input into a chamber housing the mixing area and a second particulate input having a second input into the chamber, wherein the first and second input are spaced apart by corridor of the chamber.

5. The particulate system of claim 1, further comprising:

a first operated conveyance of the one or more metering controls, the first operated conveyance disposed within a first one of the opposing particulate input.

6. The particulate system of claim 1, further comprising:

a second operated conveyance of the one or more metering controls, the second operated conveyance disposed within a second one of the opposing particulate input.

7. The particulate system of claim 1, further comprising:

a generally circular air chamber having a diameter greater than the particulate inputs and housing the mixing area wherein air from the air input and the particulate have generally the same conveyance speed at a mixing area outlet.

8. A particulate metering system for agriculture applications, comprising:

a flow path having:

a. an inlet with an intake configured to receive a stream of pressurized air for suspending particulate in the stream of pressurized air for agriculture applications;

b. an outlet with a discharge configured to dispense particulate suspended in the stream of pressurized air for agriculture applications;

c. an air input connected to the intake for providing the stream of pressurized air into the intake;

d. an air-particulate output at the discharge;

a particulate source housed in a particulate bin in the flow path between the intake and the discharge;

a particulate input in communication with the flow path between the intake and the discharge;

a particulate intake between the particulate input and operated conveyance;

a particulate-air mixing area within the flow path comprising a confluence of the pressurized stream of air and particulate from the particulate source;

wherein the particulate-air mixing area is disposed between a pair of the operated conveyances and a pair of the particulate intake.

9. The particulate metering system of claim 8, wherein the particulate-air mixing area comprises opposing particulate input spaced apart by the air input.

10. The particulate metering system of claim 8, further comprising:

an operated conveyance enclosure housing the operated conveyance between the particulate-air mixing area and the particulate intake.

11. The particulate metering system of claim 8, further comprising:

a first operated conveyance enclosure operably attached to a chamber housing the particulate-air mixing area and a second operated conveyance enclosure operably attached to the chamber housing the particulate-air mixing area, wherein the first and second operated conveyance are spaced apart by the chamber housing the particulate-air mixing area.

12. The particulate metering system of claim 8, further comprising:
a first one of the particulate intake into a first operated conveyance enclosure separated from a second on of the particulate intake into a second operated conveyance enclosure.

13. The particulate metering system of claim 8, further comprising:
a chamber housing the particulate-air mixing area, wherein the chamber is separated from the particulate intake by the operated conveyance.

14. A particulate metering system, comprising:
an air flow source;
a particulate accelerator, having:
a. an air input operably connected to the air flow source and the particulate accelerator;
b. a pair of particulate input operably connected to and disposed on opposing sides of the particulate accelerator;
c. a pair of air-particulate interfaces spaced apart by the air input;
d. a mixing area, wherein the pair of particulate interfaces are spaced apart by the mixing area;
e. an air-particulate output opposite the air input;
a particulate source having a discharge into each of the pair of air-particulate interfaces;
a confluence of air from the air input and particulate from the particulate source in the mixing area of the particulate accelerator; and
an air-particulate discharge operably connected in communication with the air-particulate output of the particulate accelerator;
wherein air from the air input is introduced into the mixing area between the pair of air-particulate interfaces.

15. The particulate metering system of claim 14, further comprising:
a chamber housing the mixing area and having opposing sides terminating at the opposing pair of air-particulate interfaces.

16. The particulate metering system of claim 14, further comprising:
a chamber housing the mixing area, wherein the chamber is generally disposed outside the pair of particulate input.

17. The particulate metering system of claim 14, further comprising:
an orbital contoured chamber housing the particulate accelerator.

18. The particulate metering system of claim 14, wherein the mixing area is bounded on opposing sides by a first and second one of the air-particulate interfaces.

19. The particulate metering system of claim 14, further comprising:
a first one of the pair of particulate interfaces connected by a first operated conveyance to the particulate source;
a second one of the pair of particulate interfaces connected by a second operated conveyance to the particulate source;
wherein the first and second operated conveyance are spaced apart by the particulate accelerator.

20. The particulate system of claim 14, further comprising:
a metering control at the pair of air-particulate interfaces for controlling a blend of the particulate and air in the mixing area.

* * * * *